US012785330B2

(12) United States Patent
Tseng et al.

(10) Patent No.: US 12,785,330 B2
(45) Date of Patent: Nov. 3, 2026

(54) CONNECTING STRUCTURE AND SIGNAL TRANSMISSION SYSTEM

(71) Applicant: CYNTEC CO., LTD., Hsinchu (TW)

(72) Inventors: Shih-Hsien Tseng, Hsinchu (TW); Sheng-Ju Chou, Hsinchu (TW); Ming-Feng Chiang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 360 days.

(21) Appl. No.: 18/413,058

(22) Filed: Jan. 16, 2024

(65) Prior Publication Data

US 2024/0243527 A1 Jul. 18, 2024

Related U.S. Application Data

(60) Provisional application No. 63/439,530, filed on Jan. 17, 2023.

(51) Int. Cl.

*H01R 13/6585* (2011.01)
*H01R 12/77* (2011.01)
*H01R 12/79* (2011.01)
*H01R 13/6461* (2011.01)

(52) U.S. Cl.

CPC ....... *H01R 13/6585* (2013.01); *H01R 12/771* (2013.01); *H01R 12/79* (2013.01); *H01R 13/6461* (2013.01)

(58) Field of Classification Search

CPC ....................... H01R 13/6585; H01R 13/6461; H01R 12/79; H01R 12/771
USPC ........................................................ 439/493
See application file for complete search history.

(56) References Cited

U.S. PATENT DOCUMENTS 3,296,365 A * 1/1967 Basile .................... H05K 1/118 174/117 FF
3,891,293 A * 6/1975 Jones ................... H01R 12/616 439/422
4,808,112 A * 2/1989 Wood ..................... H05K 3/365 439/67
4,975,068 A * 12/1990 Squires .................. H01R 12/78 439/372
5,857,259 A * 1/1999 Johnston ................ H01R 43/28 174/76
5,936,850 A * 8/1999 Takahashi ........... G02F 1/13452 361/776

(Continued)

FOREIGN PATENT DOCUMENTS

TW 201438349 A 10/2014
TW M580813 U 7/2019

*Primary Examiner* — Harshad C Patel
(74) *Attorney, Agent, or Firm* — Winston Hsu

(57) ABSTRACT

A connecting structure includes a flexible flat cable. The flexible flat cable includes a first end portion, a second end portion, a connecting portion, a first pad region, a second pad region and a slot. The connecting portion is connected between the first end portion and the second end portion. The first pad region is disposed on the first end portion. The second pad region is disposed on the second end portion. The slot is formed in the connecting portion. The slot is extended along a length direction of the flexible flat cable. The flexible flat cable is a laminated structure including at least one set of signal trace pattern and at least one shielding structure. The at least one shielding structure correspondingly surrounds the at least one set of signal trace pattern in the connecting portion.

28 Claims, 17 Drawing Sheets

(56) References Cited

U.S. PATENT DOCUMENTS 6,017,244 A * 1/2000 Daane .................... H05K 3/365 439/495
6,123,551 A * 9/2000 Westfall ................. H01R 12/62 439/74
6,165,009 A * 12/2000 Anbo ..................... H01R 31/02 439/379
6,226,862 B1 * 5/2001 Neuman ................ H05K 3/363 219/616
6,247,951 B1 * 6/2001 Di Liello ............... H01R 12/61 439/492
6,344,616 B1 * 2/2002 Yokokawa ............. H05K 3/403 174/117 F
6,431,876 B1 * 8/2002 Svenkeson ............. H01R 12/78 439/62
6,722,915 B1 * 4/2004 McAlonis ............ H01R 12/721 439/493
6,753,477 B1 * 6/2004 Sinkunas ............. H01R 12/613 174/117 FF
7,223,105 B2 * 5/2007 Weiss ................. H01R 13/2414 439/497
7,341,476 B2 * 3/2008 Soeta ..................... H01R 12/61 439/493
7,462,035 B2 * 12/2008 Lee ...................... H01R 12/592 439/37
7,529,100 B2 * 5/2009 Chuang ................ H05K 1/0283 174/254
7,804,680 B2 * 9/2010 Mundt .................. G06F 3/0213 400/692
7,807,927 B2 * 10/2010 Yeh ...................... H01B 7/0838 174/117 FF
7,968,796 B2 * 6/2011 Chang .................. H01B 7/0892 174/117 FF
8,251,712 B2 * 8/2012 Cheng .................... H01R 12/73 439/329
8,290,326 B2 * 10/2012 Furuyama ............ H05K 1/0274 385/129
9,029,707 B2 * 5/2015 Kim ..................... H01B 7/0892 174/117 F
9,779,848 B2 * 10/2017 Wu .......................... H01B 1/02
9,974,187 B2 * 5/2018 Standing ................ H05K 1/189
10,149,980 B2 * 12/2018 Shah .................. H01R 13/2421
2006/0030171 A1 * 2/2006 Hung ..................... H05K 1/118 439/67
2006/0042820 A1 * 3/2006 Lin ........................ H05K 1/028 174/117 F
2006/0048969 A1 * 3/2006 Huang ................. H04N 1/1017 174/254
2009/0194342 A1 * 8/2009 Kuo ....................... H05K 1/147 178/18.03
2010/0016039 A1 * 1/2010 Tokuyama ............. H05K 1/118 29/830
2010/0045192 A1 * 2/2010 Lee ........................ H05B 47/11 315/149
2012/0315774 A1 * 12/2012 Williams ............... H01R 12/79 439/68
2012/0319967 A1 * 12/2012 Tsai ........................ G06F 1/184 345/173
2014/0057482 A1 * 2/2014 Su ........................ H01R 12/594 439/493
2015/0101855 A1 * 4/2015 Wu ........................ H05K 3/341 29/860
2015/0213924 A1 * 7/2015 Chang .................. H05K 1/0218 174/107
2015/0214644 A1 * 7/2015 Chang .................... H01R 12/79 439/498

* cited by examiner

CONNECTING STRUCTURE AND SIGNAL TRANSMISSION SYSTEM

CROSS REFERENCE TO RELATED APPLICATIONS

This application claims the benefit of U.S. Provisional Application No. 63/439,530, filed on Jan. 17, 2023. The content of the application is incorporated herein by reference.

BACKGROUND OF THE INVENTION

1. Field of the Invention

The present disclosure relates to a connecting structure and a signal transmission system, and more particularly, to a connecting structure and a signal transmission system favorable for the application of high-speed signal transmission.

2. Description of the Related Art

In general, electrical devices, such as an optical module or an integrated circuit, mounted on a printed circuit board (PCB) may transmit signals through the trace pattern of the PCB. However, excessive insertion loss may occur in the high-speed signal transmission. Therefore, how to improve the quality of high-speed signal transmission has become a goal of relevant industries.

SUMMARY OF THE INVENTION

According to an embodiment of the present disclosure, a connecting structure includes a flexible flat cable. The flexible flat cable includes a first end portion, a second end portion, a connecting portion, a first pad region, a second pad region and a slot. The connecting portion is connected between the first end portion and the second end portion. The first pad region is disposed on the first end portion. The second pad region is disposed on the second end portion. The slot is formed in the connecting portion. The slot is extended along a length direction of the flexible flat cable. The flexible flat cable is a laminated structure including at least one set of signal trace pattern and at least one shielding structure. The at least one shielding structure correspondingly surrounds the at least one set of signal trace pattern in the connecting portion.

According to another embodiment of the present disclosure, a signal transmission system includes a system board, a first device, a second device and a connecting structure. The first device is coupled to the system board. The first device is configured to provide a high-speed signal and a low-speed signal. The second device is coupled to the system board. The connecting structure includes a flexible flat cable. The flexible flat cable includes a first end portion, a second end portion, a connecting portion, a first pad region and a second pad region. The first end portion and the second end portion are respectively coupled to the first device and the second device. The first pad region is disposed on the first end portion. The second pad region is disposed on the second end portion. The flexible flat cable is a laminated structure including at least one set of signal trace pattern and at least one shielding structure. The at least one shielding structure correspondingly surrounds the at least one set of signal trace pattern in the connecting portion. The low-speed signal is transmitted from the first device to the second device through the system board, and the high-speed signal is transmitted from the first device to the second device through the connecting structure.

According to yet another embodiment of the present disclosure, a connecting structure includes two flexible flat cables and a fixing member. Each of the flexible flat cables includes a first end portion, a second end portion, a connecting portion, a first pad region and a second pad region. The connecting portion is connected between the first end portion and the second end portion. The first pad region is disposed on the first end portion. The second pad region is disposed on the second end portion. Each of the flexible flat cables is a laminated structure including at least one set of signal trace pattern and at least one shielding structure. The at least one shielding structure correspondingly surrounds the at least one set of signal trace pattern in the connecting portion. The two flexible flat cables are arranged along a vertical direction, and there is a space between the two connecting portions of the two flexible flat cables. The fixing member is disposed at one side of the connecting portion of each of the two flexible flat cables adjacent to the first end portion to bond the two flexible flat cables.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as up, down, left, right, front, back, bottom or top is used with reference to the orientation of the Figure(s) being described. The elements of the present disclosure can be positioned in a number of different orientations. As such, the directional terminology is used for purposes of illustration and is in no way limiting. In addition, identical numeral references or similar numeral references are used for identical elements or similar elements in the following embodiments.

Hereinafter, for the description of "the first feature is formed on or above the second feature", it may refer that "the first feature is in contact with the second feature directly", or it may refer that "there is another feature between the first feature and the second feature", such that the first feature is not in contact with the second feature directly.

It is understood that, although the terms first, second, etc. may be used herein to describe various elements, regions, layers and/or sections, these elements, regions, layers and/or sections should not be limited by these terms. These terms may be only used to distinguish one element, region, layer and/or section from another element, region, layer and/or section. Terms such as "first," "second," and other numerical terms when used herein do not imply a sequence or order unless clearly indicated by the context. Thus, a first element, region, layer and/or section discussed below could be termed a second element, region, layer and/or section without departing from the teachings of the embodiments. The terms used in the claims may not be identical with the terms used in the specification, but may be used according to the order of the elements claimed in the claims.

The term "electrically connected", "electrically contact" or "coupled to" includes means of direct or indirect electrical connection.

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Figure 1:
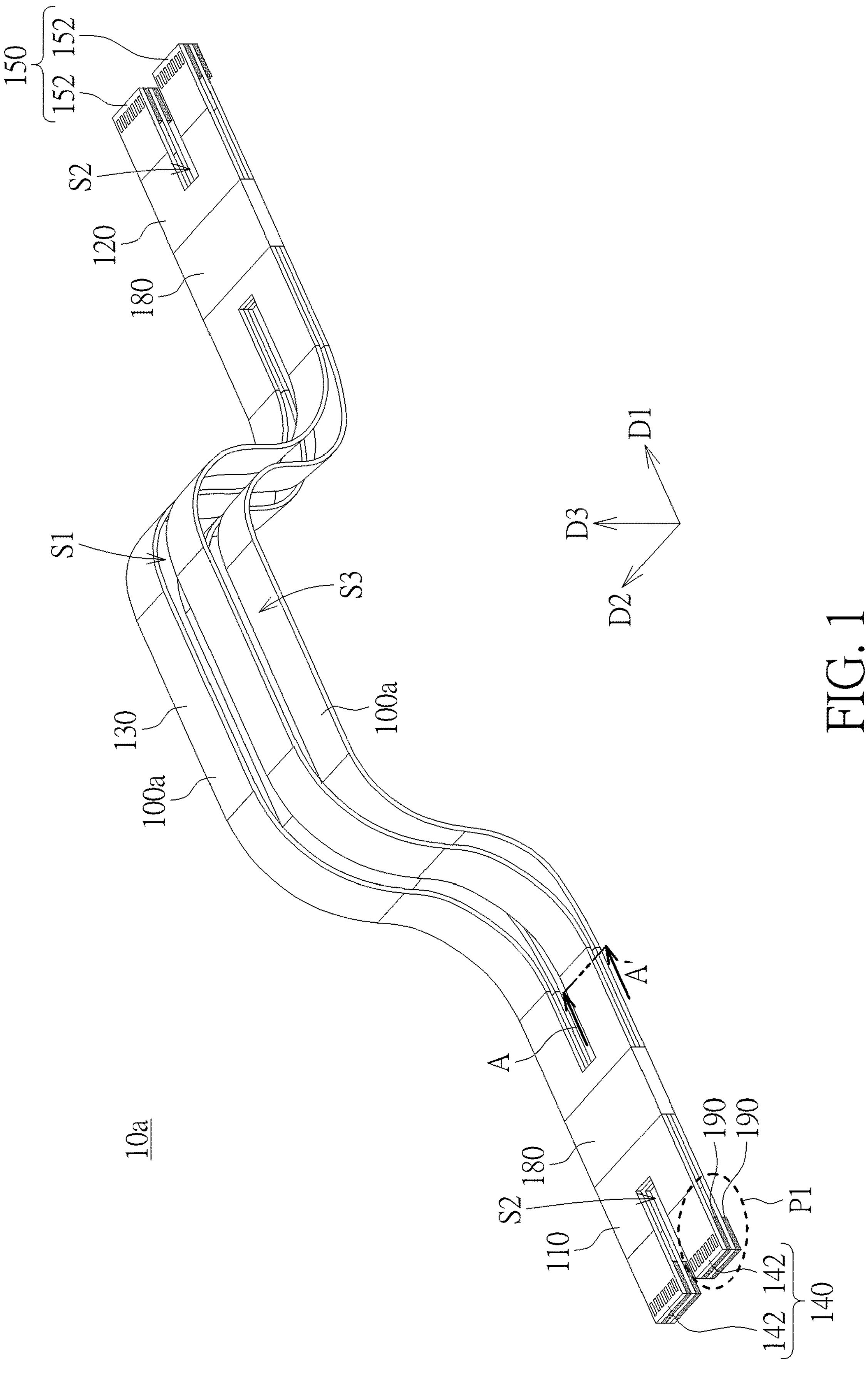
FIG. 1 is a three-dimensional diagram showing a connecting structure according to an embodiment of the present disclosure.
Figure 2:
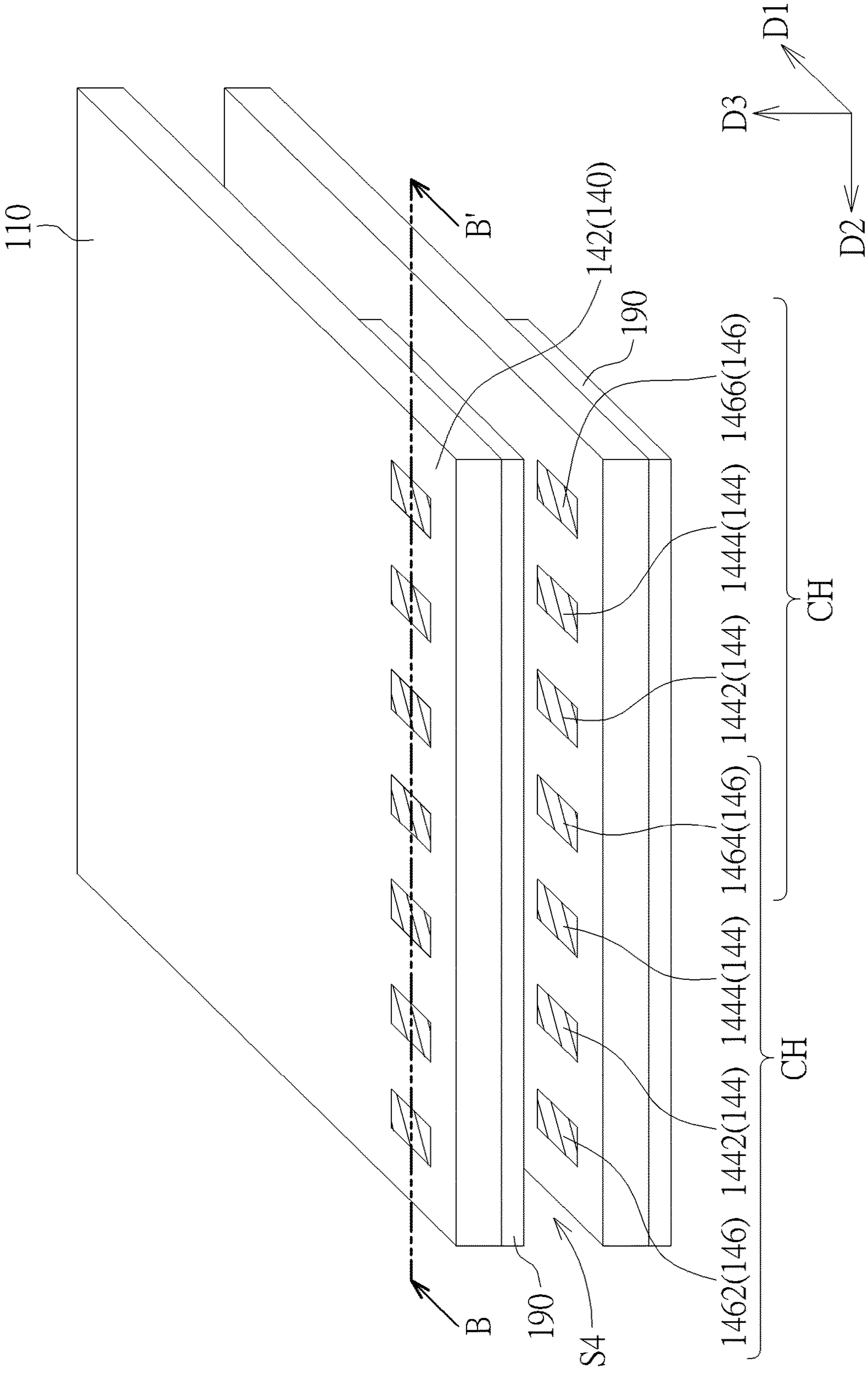
FIG. 2 is an enlarged view of a portion P1 shown in FIG. 1.
Figure 3:
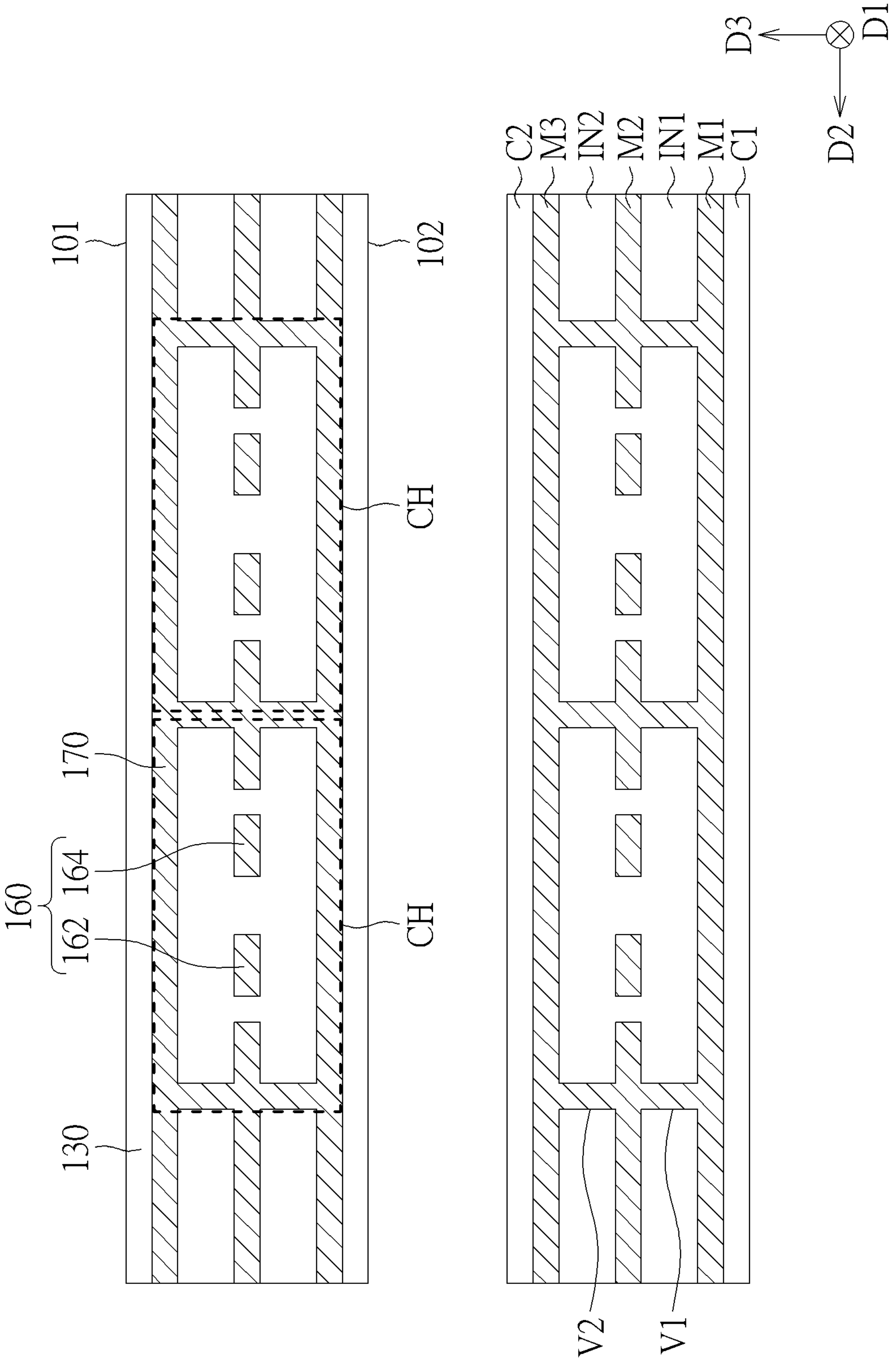
FIG. 3 schematically illustrates a cross-sectional view taken along a line A-A' in FIG. 1.
Figure 4:
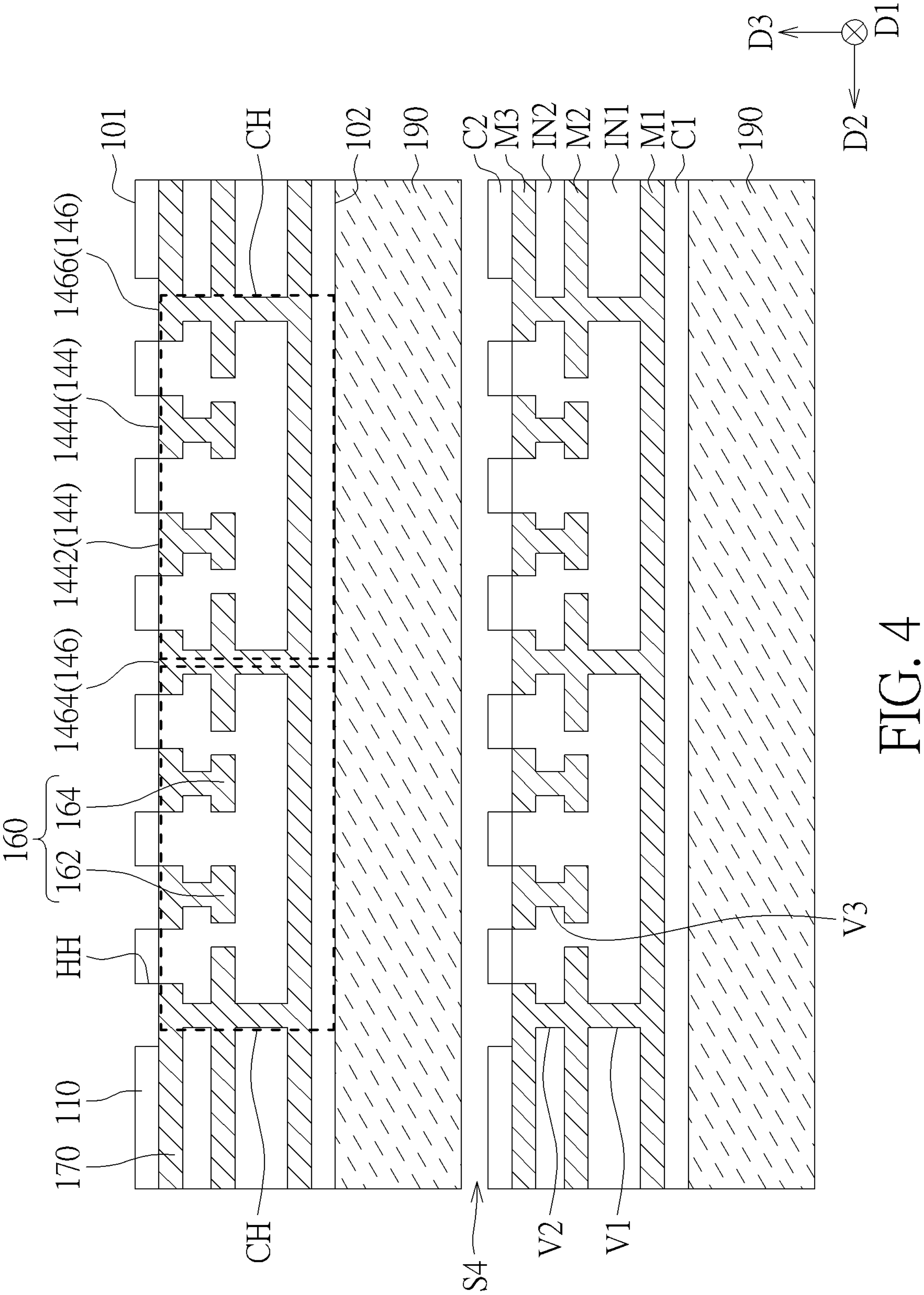
FIG. 4 schematically illustrates a cross-sectional view taken along a line B-B' in FIG. 2.
Figure 5:
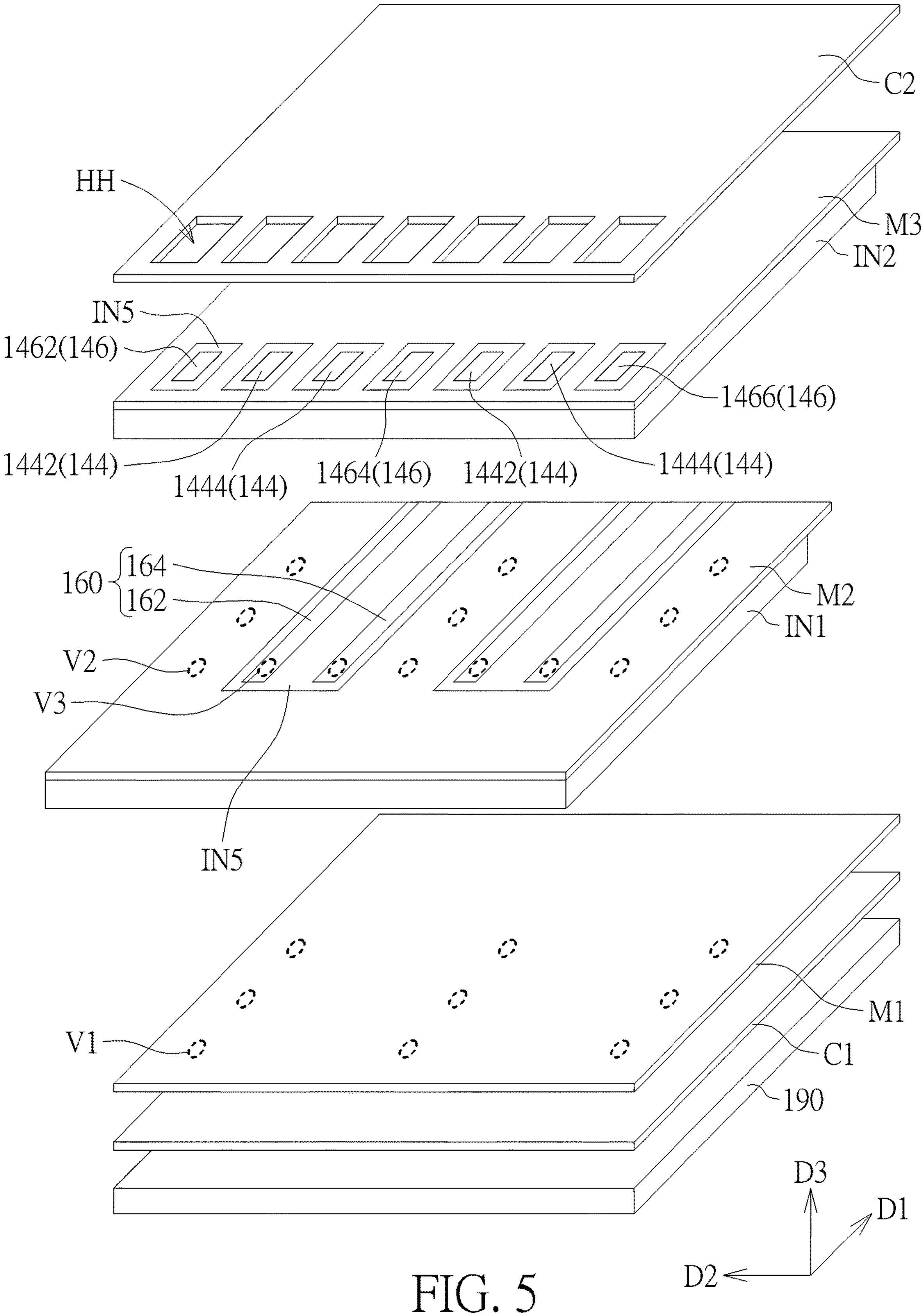
FIG. 5 is an exploded diagram showing a flexible flat cable shown in FIG. 2.

Please refer to FIG. 1 to FIG. 5. FIG. 1 is a three-dimensional diagram showing a connecting structure 10*a* according to an embodiment of the present disclosure. FIG. 2 is an enlarged view of a portion P1 shown in FIG. 1. FIG. 3 schematically illustrates a cross-sectional view taken along a line A-A' in FIG. 1. FIG. 4 schematically illustrates a cross-sectional view taken along a line B-B' in FIG. 2. FIG. 5 is an exploded diagram showing a flexible flat cable 100*a* shown in FIG. 2. As shown in FIG. 1, the connecting structure 10*a* includes two flexible flat cables 100*a*. Each of the flexible flat cables 100*a* includes a first end portion 110, a second end portion 120, a connecting portion 130, a first pad region 140, a second pad region 150 and a slot S1. The connecting portion 130 is connected between the first end portion 110 and the second end portion 120. The first pad region 140 is disposed on the first end portion 110. The second pad region 150 is disposed on the second end portion 120. The slot S1 is formed in the connecting portion 130. The slot S1 is extended along the length direction D1 of the flexible flat cable 100*a*. As shown in FIGS. 3-5, the flexible flat cable 100*a* is a laminated structure including at least one set of signal trace pattern 160 and at least one shielding structure 170. The at least one shielding structure 170 correspondingly surrounds the at least one set of signal trace pattern 160 in the connecting portion 130. With the slot S1, it is favorable for reducing the bending stress and/or twist stress during assembly.

The flexible flat cable 100*a* may include a flexible circuit or a flexible printed circuit (FPC). The length direction D1 of the flexible flat cable 100*a* may be parallel to an assembling direction of the flexible flat cable 100*a*. The assembling direction may be the direction that the flexible flat cable 100*a* is assembled with (or inserted into or plugged into) a connector. The width direction D2 of the flexible flat cable 100*a* may be perpendicular to the length direction D1 of the flexible flat cable 100*a*. The first surface 101 (see FIG. 3) of the flexible flat cable 100*a* may define a normal direction (not shown), and the vertical direction D3 may be parallel to the normal direction.

Herein, the number of the flexible flat cables 100*a* is two, and the two flexible flat cables 100*a* are arranged along the vertical direction D3. The number of the flexible flat cables 100*a* is exemplarily and the present disclosure is not limited thereto. For example, the number of the flexible flat cables 100*a* may be one, three, four, etc. That is, the number of the flexible flat cables 100*a* may be adjusted according to actual need. When the connecting structure 10*a* includes a plurality of flexible flat cables 100*a*, it is favorable for increasing the channel density.

The first end portions 110 of the two flexible flat cables 100*a* may be bonded with each other. Thereby, it is favorable for simultaneously picking or moving the two flexible flat cables 100*a*, so that the first end portions 110 of the two flexible flat cables 100*a* may be assembled with a connector at the same time, so as to achieve one-time assembly. The connecting structure 10*a* may further include a spacer 190 disposed between the two first end portions 110 of the two flexible flat cables 100*a*. The first end portions 110 of the two flexible flat cables 100*a* may be bonded with each other through the spacer 190. The spacer 190 may overlap the two first end portions 190 of the two flexible flat cables 100*a*. Specifically, the spacer 190 may overlap the signal pads 144 and the ground pads 146 of the two flexible flat cables 100*a* in the vertical direction D3. In the embodiment, the spacer 190 is only disposed in the first end portion 110 and is not extended to the connecting portion 130. Since the signals (not shown) are transmitted out the flexible flat cables 100*a* through the signal pads 144 which are not shielded by the shielding structure 170, the isolation property may be enhanced by the spacer 190 so as to prevent the crosstalk from occurring in the first end portion 110. The spacer 190 may be made of a conductive material or a non-conductive material. When the spacer 190 is made of a conductive material, the spacer 190 may reduce the crosstalk through the electromagnetic interference (EMI). When the spacer 190 is made of a non-conductive material, the spacer 190 may be arranged with a thicker thickness to create a lager distance between the two flexible flat cables 100*a* to reduce the crosstalk. The spacer 190 may be made of a rigid material to strengthen the structural strength. Therefore, with the spacer 190, it is beneficial to reduce the crosstalk between the two flexible flat cables 100*a*, and it is beneficial to strengthen the structural strength. In some embodiments, each of the flexible flat cables 100*a* may include the spacer 190 disposed on the second surface 102 opposite to the first surface 101 disposed with the signal pads 144 and ground pads 146 (see FIG. 2 and FIG. 4), which is beneficial to reduce the interference from external signals.

There is a space S3 between the two connecting portions 130 of the two flexible flat cables 100*a*. That is, the connecting portions 130 of the two flexible flat cables 100*a* are not bonded with each other. Compared with the configuration that the two connecting portions 130 of the two flexible flat cables 100*a* are integrally formed or bonded with each other, with the space S3, it is favorable for reducing stress when the two flexible flat cables 100*a* are assembled on a hard board. Moreover, the two flexible flat cables 100*a* may be configured with different lengths, so that the two flexible flat cables 100*a* may be used to transmit signals with different properties.

The connecting structure 10*a* may further include a fixing member 180 disposed at one side of the connecting portion 130 of each of the two flexible flat cables 100*a* adjacent to the first end portion 110 to bond the two flexible flat cables 100*a*. With the fixing member 180, it is favorable for simultaneously picking or moving the two flexible flat cables 100*a*, which is favorable for simplifying the assembling process, so as to improve the assembly convenience. The fixing member 180, for example, may be a flexible band, but not limited thereto.

According to the configuration of the flexible flat cables 100*a*, the two flexible flat cables 100*a* may be fabricated independently, and then the flexible flat cables 100*a* may be bonded through the spacer 190 and/or the fixing member 180, which is favorable for saving the fabricating cost.

As shown in FIG. 1, the first pad region 140 may include two sub-pad regions 142, and the flexible flat cable 100*a* may further include a recess S2 formed between the two sub-pad regions 142. The slot S1 is aligned with the recess S2 along the length direction D1 of the flexible flat cable 100*a*. With the recess S2, it is favorable for the application that the high-speed signal and the low-speed signal are transmitted in different path, which may refer to the description related to FIG. 16 and FIG. 17.

As shown in FIG. 2, each of the sub-pad regions 142 of the first pad region 140 includes a plurality of ground pads 146 and a plurality of signal pads 144, which are a first ground pad 1462, a first signal pad 1442, a second signal pad 1444, a second ground pad 1464, a first signal pad 1442, a second signal pad 1444 and a third ground pad 1466 arranged in sequence along the width direction D2 of the flexible flat cable 100*a*.

As shown in FIG. 3, in the connecting portion 130, each set of signal trace pattern 160 may surrounded by a corresponding shielding structure 170 to form a channel CH. That is, in the connecting portion 130, the at least one set of signal trace pattern 160 and the shielding structure 170 overlap in the width direction D2 and overlap in the vertical direction D3 of the flexible flat cable 100*a*. When the flexible flat cable 100*a* includes a plurality of sets of signal trace patterns 160 and a plurality of shielding structures 170, the plurality of shielding structures 170 correspondingly and respectively surround the plurality of sets of signal trace patterns 160, such that the crosstalk between the signals transmitted by the plurality of sets of signal trace patterns 160 can be prevented. Moreover, the distance between two sets of signal trace patterns 160 or the distance between the set of signal trace pattern 160 and the shielding structure 170 may be accurately defined. Therefore, in the high-speed transmittance, the stability of the electrical properties, such as high-frequency impedance and return loss, of the sets of signal trace patterns 160 may be improved.

In the embodiment, each of the sub-pad regions 142 may include two channels CH. That is, the first pad region 140 or the flexible flat cable 100*a* may include four channels CH. In some embodiments, each set of signal trace pattern 160 may include a first signal trace pattern 162 and a second signal trace pattern 164 arranged along the width direction D2 of the flexible flat cable 100*a*. For example, one of the first signal trace pattern 162 and the second signal trace pattern 164 is a positive signal trace pattern, the other one of the first signal trace pattern 162 and the second signal trace pattern 164 is a negative signal trace pattern, so that the first signal trace pattern 162 and the second signal trace pattern 164 form a differential signal pair, and the set of signal trace pattern 160 transmits signals in a differential manner. Thereby, it is favorable for enhancing the degree of signal integrity. In some embodiments, the set of signal trace pattern 160 may only include a single signal trace pattern, and the set of signal trace pattern 160 transmits signals in a non-differential manner. Therefore, it can effectively prevent the sets of signals from being interfered with each other or the flexible flat cable 100*a* may have a higher volume density when external interference exists.

As shown in FIG. 4, the at least one set of signal trace pattern 160 is electrically connected to the signal pads 144 disposed on the first pad region 140, and the at least one shielding structure 170 is electrically connected to the ground pads 146 disposed on the first pad region 140. In the first pad region 140 of the first end portion 110, the at least one set of signal trace pattern 160 and the shielding structure 170 overlap in the width direction D2 of the flexible flat cable 100*a*. Specifically, the first signal trace pattern 162 is electrically connected to the first signal pad 1442, and the second signal trace pattern 164 is electrically connected to the second signal pad 1444. The second ground pad 1464 is disposed between the second signal pad 1444 of the channel CH at the left side and the first signal pad 1442 of the channel CH at the right side. That is, the two channels CH share the second ground pad 1464 disposed therebetween.

More specifically, as shown in FIGS. 3-5, each of the flexible flat cable 100*a* is a laminated structure. The laminated structure includes, from bottom to top, a protective layer C1, a metal layer M1, an insulating layer IN1, a metal layer M2, an insulating layer IN2, a metal layer M3 and a protective layer C2. The signal pads 144 and the ground pads 146 are exposed from the holes HH formed in the protective layer C2. A plurality of vias V1 are formed in the insulating layer IN1, and the metal material (not labeled) is filled in the vias V1, such that the portion of the metal layer M1 and the portion of the metal layer M2 corresponding to the shielding structure 170 are electrically connected with each other. A plurality of vias V2 are formed in the insulating layer IN2, and the metal material (not labeled) is filled in the vias V2, such that the portion of the metal layer M2 corresponding to the shielding structure 170 and the portion of the metal layer M3 corresponding to the ground pads 146 or the shielding structure 170 are electrically connected with each other. The plurality of vias V2 are aligned with the vias V1 respectively. A plurality of vias V3 are formed in the insulating layer IN2, and the metal material (not labeled) is filled in the vias V3, such that and the portion of the metal layer M2 corresponding to the set of signal trace pattern 160 and the portion of the metal layer M3 corresponding to the signal pads 144 are electrically connected with each other. Each of the signal pads 144 and the ground pads 146 may be surrounded by the insulating structure IN5, and each of the first signal trace pattern 162 and the second signal trace pattern 164 may be surrounded by the insulating structure IN5. The protective layers C1 and C2 may include an organic material or an inorganic material. The organic material may include, for example, acrylic, epoxy, resin or other suitable materials. The inorganic material may include, for example, silicon oxide ($SiO_x$), silicon nitride ($SiN_x$), silicon oxynitride ($SiO_xN_y$) or other suitable materials. The insulating layers IN1 and IN2 may include a plastic material, such as polyimide (PI), polycarbonate (PC), polyethylene terephthalate (PET), polymethyl methacrylate (PMMA) or other suitable materials. The metal layers M1, M2 and M3 may include a metal material, such as copper, silver, gold or other suitable materials.

As shown in FIG. 4, there may be an accommodating space S4 between the two first end portions 110 of the two flexible flat cables 100*a* in the vertical direction D3. Thereby, when the first end portions 110 are assembled with a connector, it is favorable for the terminals of the connector to insert into the accommodating space S4 to electrically contact the signal pads 144 or the ground pads 146 of the flexible flat cable 100*a*.

In the embodiment, the configuration of the second end portion 120 is the same as that of the first end portion 110. Specifically, the second end portions 120 of the two flexible flat cables 100*a* may be bonded with each other. Thereby, it is favorable for simultaneously picking or moving the two flexible flat cables 100*a*, so that the second end portions 120 of the two flexible flat cables 100*a* may be assembled with a connector at the same time, so as to achieve one-time assembly. The connecting structure 10*a* may further include another spacer (not shown) disposed between the two second end portions 120 of the two flexible flat cables 100*a*. The second end portions 120 of the two flexible flat cables 100*a* may be bonded with each other through the spacer. The connecting structure 10*a* may further include another fixing member 180 disposed at one side of the connecting portion 130 of each of the two flexible flat cables 100*a* adjacent to the second end portion 120 to bond the two flexible flat cables 100*a*. The second pad region 150 may include two sub-pad regions 152, and the flexible flat cable 100*a* further includes a recess S2 formed between the two sub-pad regions 152. In other embodiments, the configurations of the first end portion 110 and the second end portion 120 may be different according to actual need.

Figure 6:
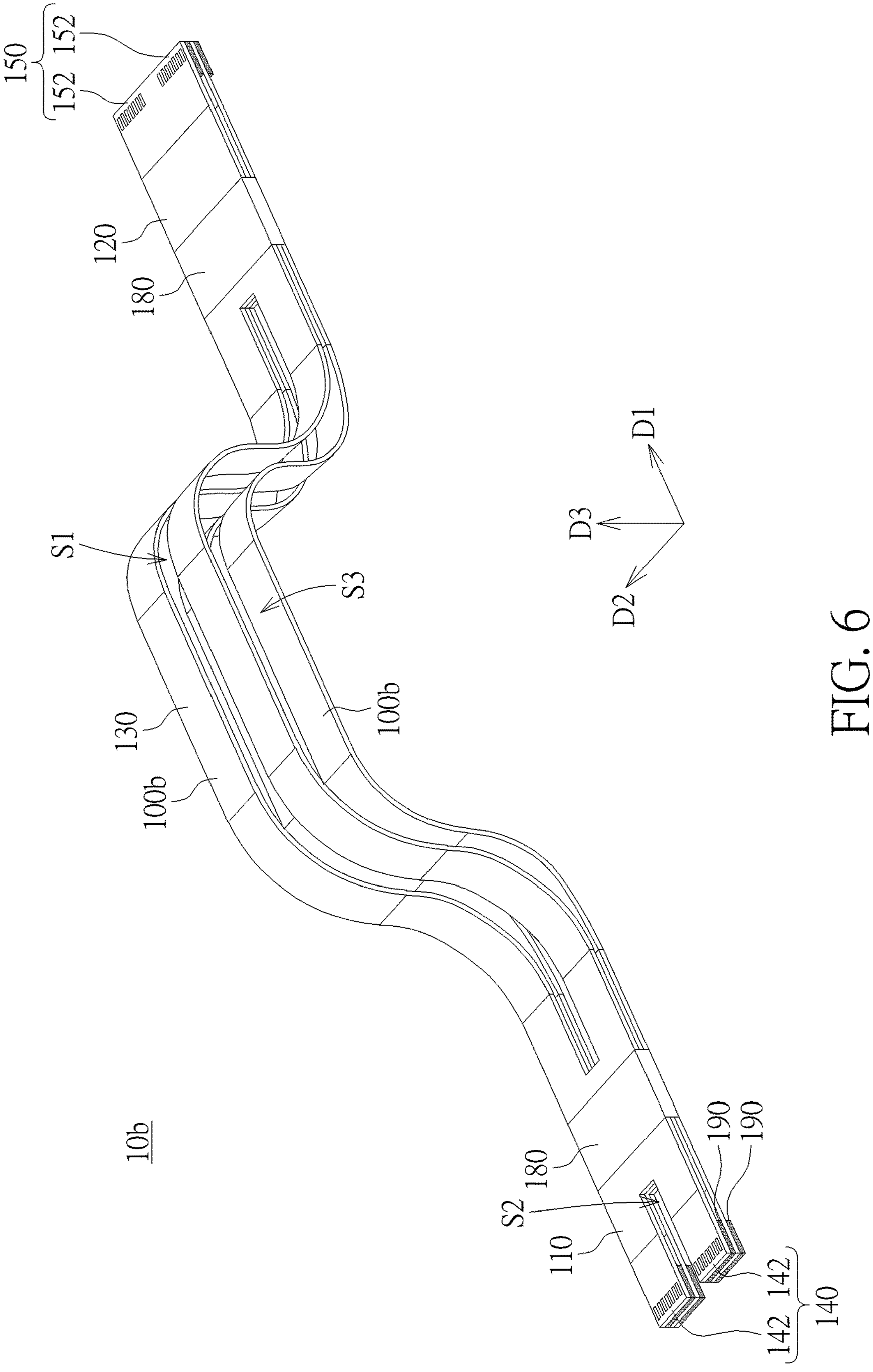
FIG. 6 is a three-dimensional diagram showing a connecting structure according to another embodiment of the present disclosure FIG. 7, which is a three-dimensional diagram showing a portion of a connecting structure according to yet another embodiment of the present disclosure.

Please refer to FIG. 6, which is a three-dimensional diagram showing a connecting structure 10*b* according to another embodiment of the present disclosure. The main difference between the connecting structure 10*b* shown in FIG. 6 and the connecting structure 10*a* shown in FIG. 1 is the configuration of the second end portion 120 of the flexible flat cable 100*b*. In FIG. 6, the second pad region 150 includes two sub-pad regions 152, and there is no recess S2 formed between the two sub-pad regions 152.

Figure 7:
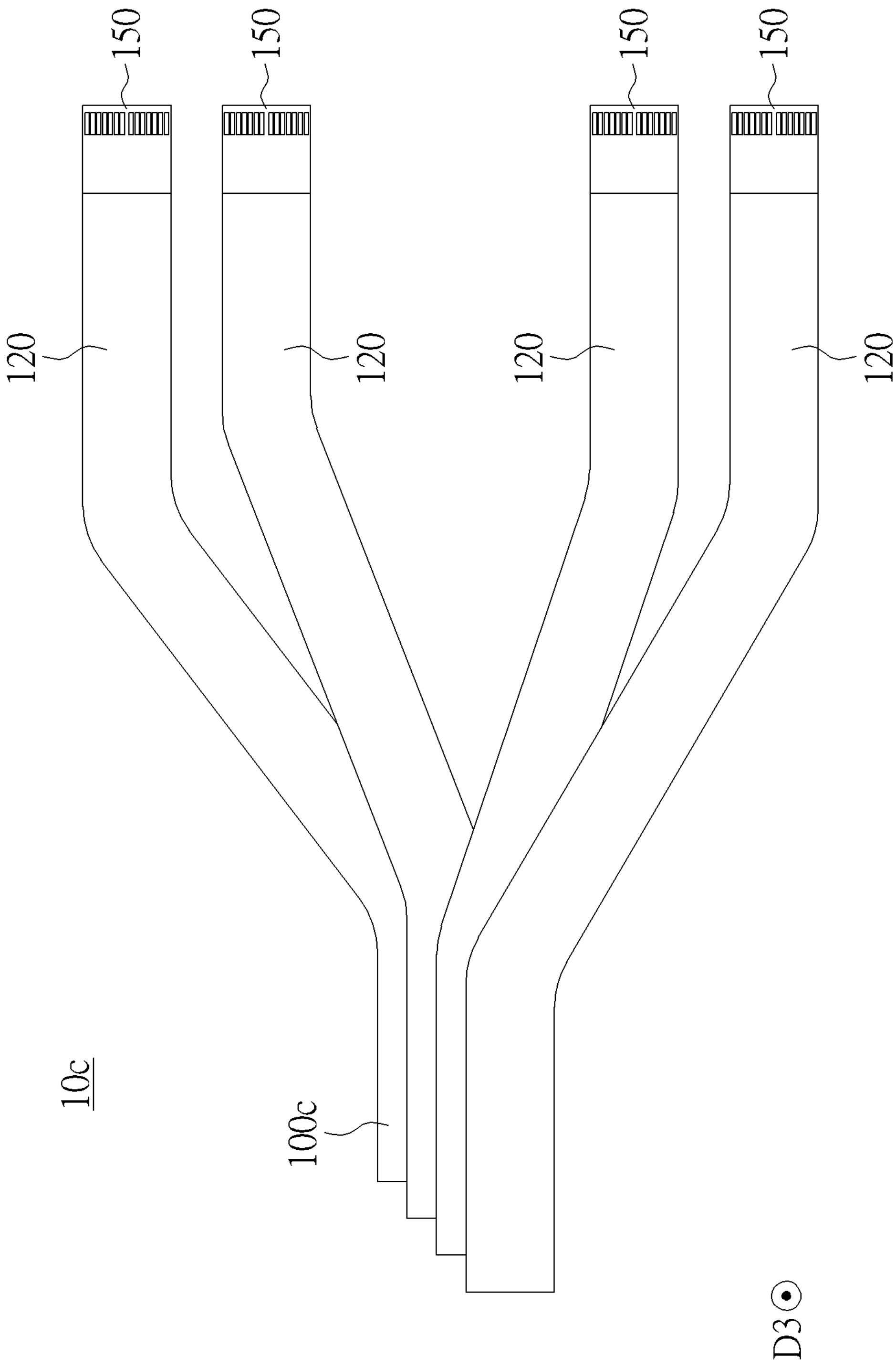

Please refer to FIG. 7, which is a three-dimensional diagram showing a portion of a connecting structure 10*c* according to yet another embodiment of the present disclosure. In FIG. 7, the connecting structure 10*c* includes four flexible flat cables 100*c*. The structure of the flexible flat cable 100*c* may be the same as the structure of the flexible flat cable 100*b* shown in FIG. 6. For the sake of simplicity, only the second end portions 120 of the flexible flat cables 100*c* are shown. Except for the number of the flexible flat cables 100*c* of the connecting structure 10*c* being different from the number of the flexible flat cables 100*b* of the connecting structure 10*b*, the main difference between the connecting structure 10*c* shown in FIG. 7 and the connecting structure 10*b* shown in FIG. 6 is the configuration of the second end portion 120. In FIG. 7, the second end portions 120 of the four flexible flat cables 100*c* are not bonded with each other. In other words, the second end portions 120 of the flexible flat cables 100*c* are separated from each other, which is favorable for increasing the freedom of circuit design and the freedom of assembly. For example, the second end portions 120 of the four flexible flat cables 100*c* may be independently connected to different electrical devices or may be independently connected to different positions of a same electrical device. Furthermore, the connecting methods between the second pad regions 150 and an electrical device (such as the system board 20 shown in FIG. 16) may be more diverse. For example, the second pad region 150 may be connected with an electrical device through inserting into a connector that connects the second pad region 150 and the electrical device or through soldering, crimping or ultrasonic welding, but not limited thereto.

Figure 8:
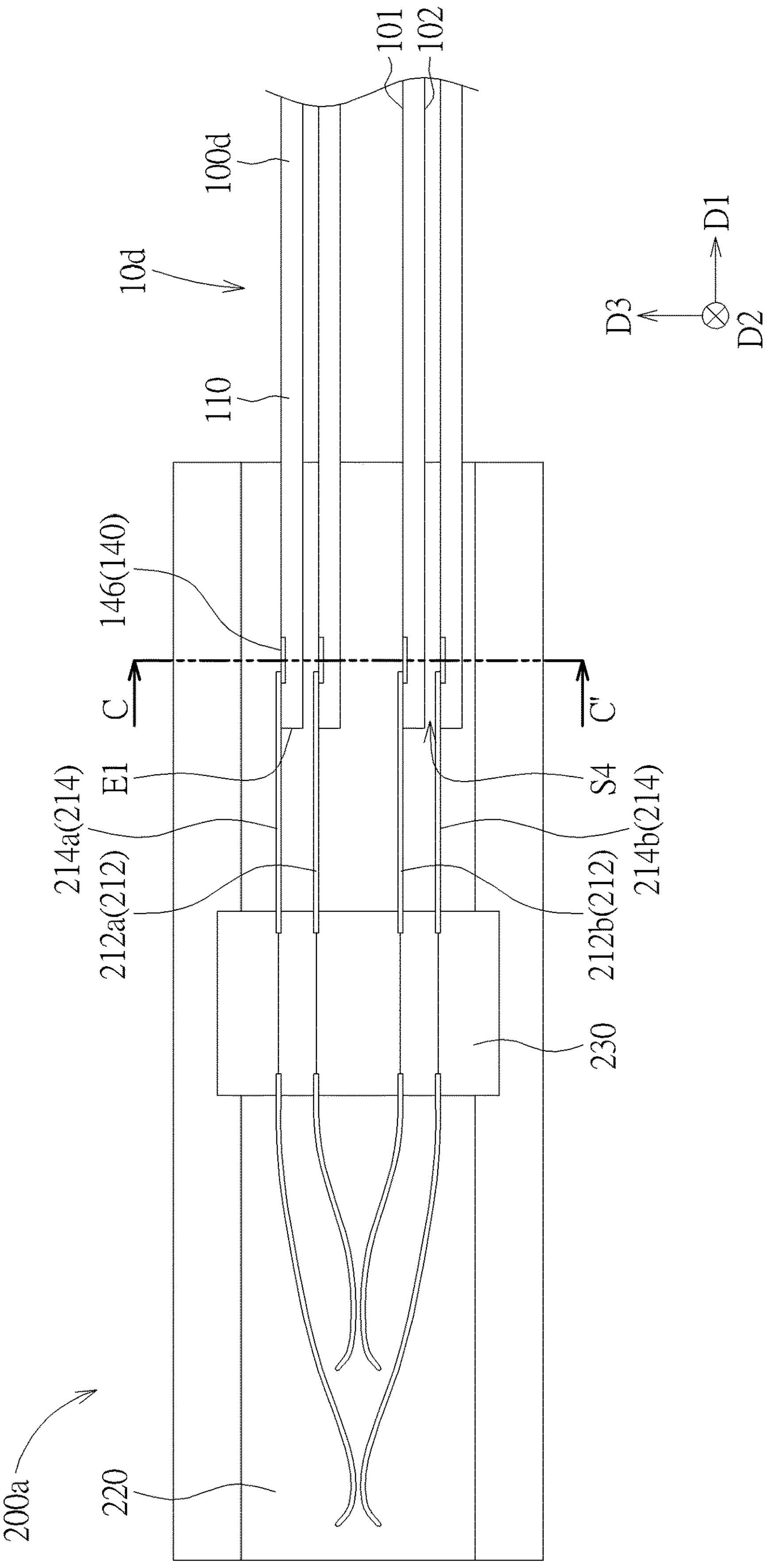
FIG. 8 is a combination schematic diagram of a connecting structure and a connector according to yet another embodiment of the present disclosure.
Figure 9:
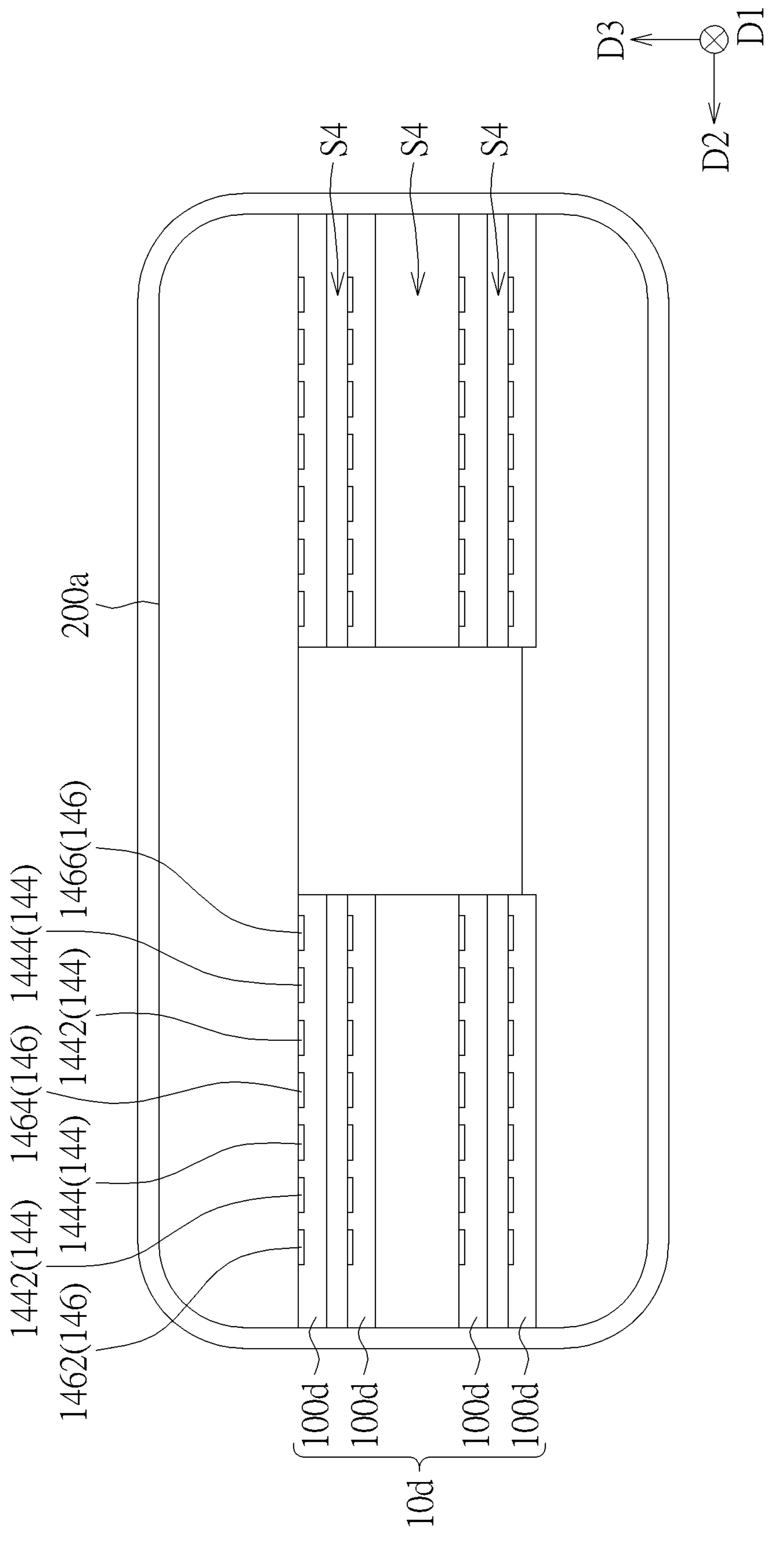
FIG. 9 schematically illustrates a cross-sectional view taken along a line C-C' in FIG. 8.

Please refer to FIG. 8 and FIG. 9, FIG. 8 is a combination schematic diagram of a connecting structure 10*d* and a connector 200*a* according to yet another embodiment of the present disclosure, FIG. 9 schematically illustrates a cross-sectional view taken along a line C-C' in FIG. 8. In FIG. 8, the connecting structure 10*d* includes four flexible flat cables 100*d*. The structure of the flexible flat cable 100*d* may be the same as the structure of the flexible flat cable 100*a* shown in FIG. 1, the structure of the flexible flat cable 100*b* shown in FIG. 6 or the structure of the flexible flat cable 100*c* shown in FIG. 7. For the sake of simplicity, only the first end portions 110 of the flexible flat cables 100*d* are shown. The first pad regions 140 of the flexible flat cables 100*d* overlap each other in the vertical direction D3, and there is an accommodating space S4 between two first end portions 110 of two adjacent flexible flat cables 100*d* in the vertical direction D3. Specifically, the left ends E1 of the first end portions 110 of the flexible flat cables 100*d* are aligned with each other in the vertical direction D3. Each of the flexible flat cables 100*d* has a first surface 101 and a second surface 102 opposite to the first surface 101. The first pad region 140 is disposed on the first surface 101, and the first surface 101 of the flexible flat cable 100*d* faces the second surface 102 of another flexible flat cable 100*d* disposed thereabove. More specifically, the first surfaces 101 of the four flexible flat cables 100*d* are all arranged to face the same direction, herein face upwardly, and the second surfaces 102 of the four flexible flat cables 100*d* are all arranged to the same direction, herein face downwardly.

The connector 200*a* may include a fixed base 230, a housing 220 and a plurality of terminal pairs 212 and a plurality of terminal pairs 214. Each of the terminal pairs 212 includes a first terminal 212*a* and a second terminal 212*b*. Each of the terminal pairs 214 includes a first terminal 214*a* and a second terminal 214*b*. Each of the right ends of the first terminal 212*a* and the second terminal 212*b* may be inserted into the accommodating space S4 to electrically contact the ground pad 146 or the signal pad 144 of one of the flexible flat cables 100*d*. Similarly, each of the right ends of the first terminal 214*a* and the second terminal 214*b* may be electrically contact the ground pad 146 or the signal pad 144 of one of the flexible flat cables 100*d*. The left ends of the first terminal 212*a* and the second terminal 212*b* may form a clip to clamp a portion of an electrical device (such as the first device 30 shown in FIG. 16). Similarly, the left ends of the first terminal 214*a* and the second terminal 214*b* may form a clip to clamp another portion of the electrical device. The connector 200*a* may be a component of the connecting structure 10*d* or the electrical device. The connector 200*a* may also be an independent component for connecting the connecting structure 10*d* and the electrical device.

Figure 10:
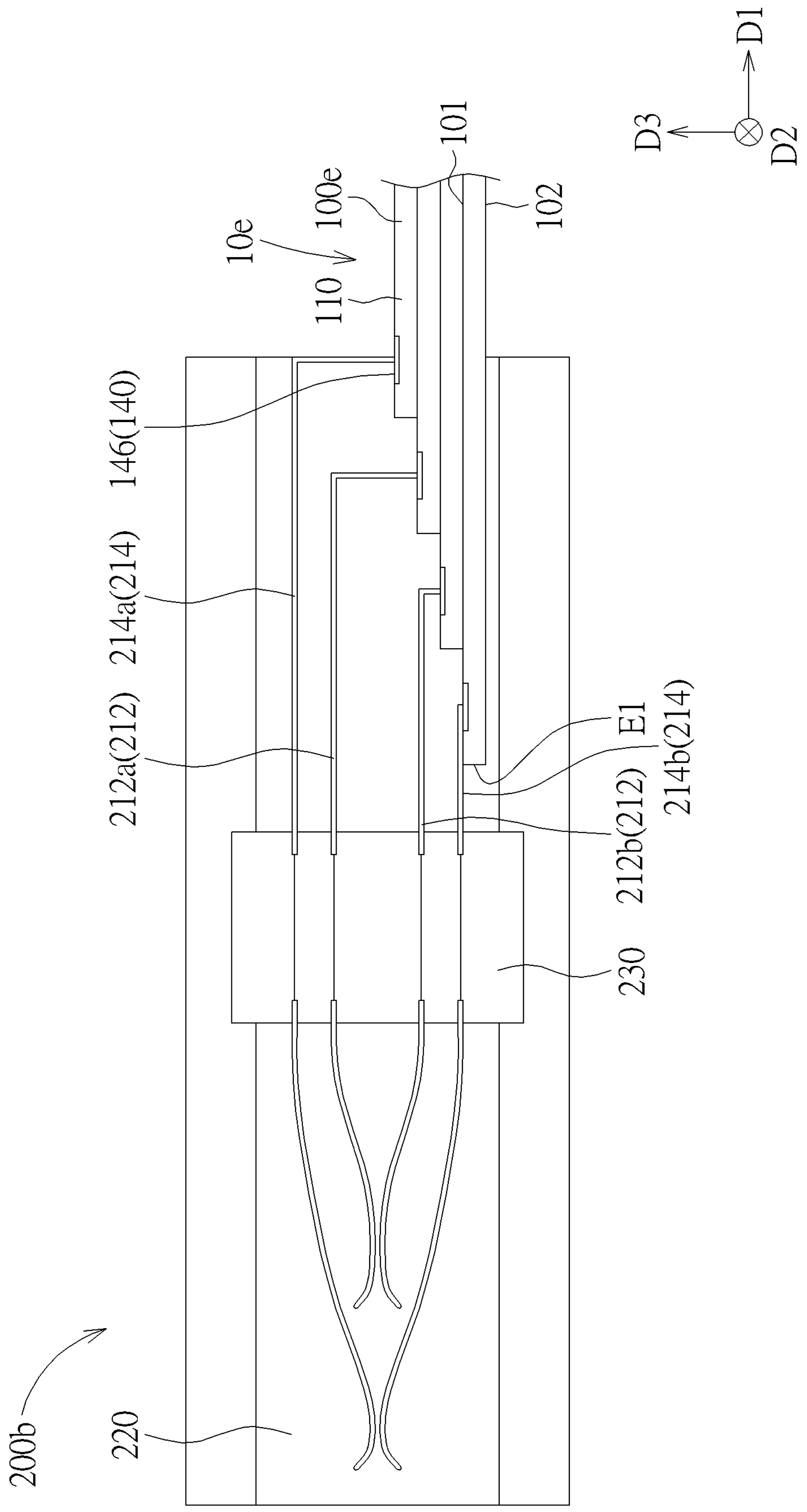
FIG. 10 is a combination schematic diagram of a connecting structure and a connector according to yet another embodiment of the present disclosure.

Please refer to FIG. 10, which is a combination schematic diagram of a connecting structure 10*e* and a connector 200*b* according to yet another embodiment of the present disclosure. In FIG. 10, the connecting structure 10*e* includes four flexible flat cables 100*e*. The structure of the flexible flat cable 100*e* may be the same as the structure of the flexible flat cable 100*a* shown in FIG. 1, the structure of the flexible flat cable 100*b* shown in FIG. 6 or the structure of the flexible flat cable 100*c* shown in FIG. 7. For the sake of simplicity, only the first end portions 110 of the flexible flat cables 100*e* are shown. The main difference between the connecting structure 10*e* shown in FIG. 10 and the connecting structure 10*d* shown in FIG. 8 is the arrangement of the flexible flat cables 100*e*. The first pad regions 140 of the flexible flat cables 100*e* do not overlap each other in the vertical direction D3, and are misaligned with each other to form a step shape. More specifically, the left ends E1 of the first end portions 110 of the flexible flat cables 100*e*, from bottom to top, are displaced to the right side gradually along the length direction D1, so as to form the step shape. There is no accommodating space S4 between two first end portions 110 of two adjacent flexible flat cables 100*e* in the vertical direction D3. Moreover, the shapes of the right ends of the first terminals 212*a* and 214*a* and the second terminal 212*b* are changed so to electrically contact the ground pad 146 or the signal pad 144. Specifically, the shape of each of the right ends of the first terminals 212*a* and 214*a* and the second terminal 212*b* is changed from a straight shape to an L shape.

Figure 11:
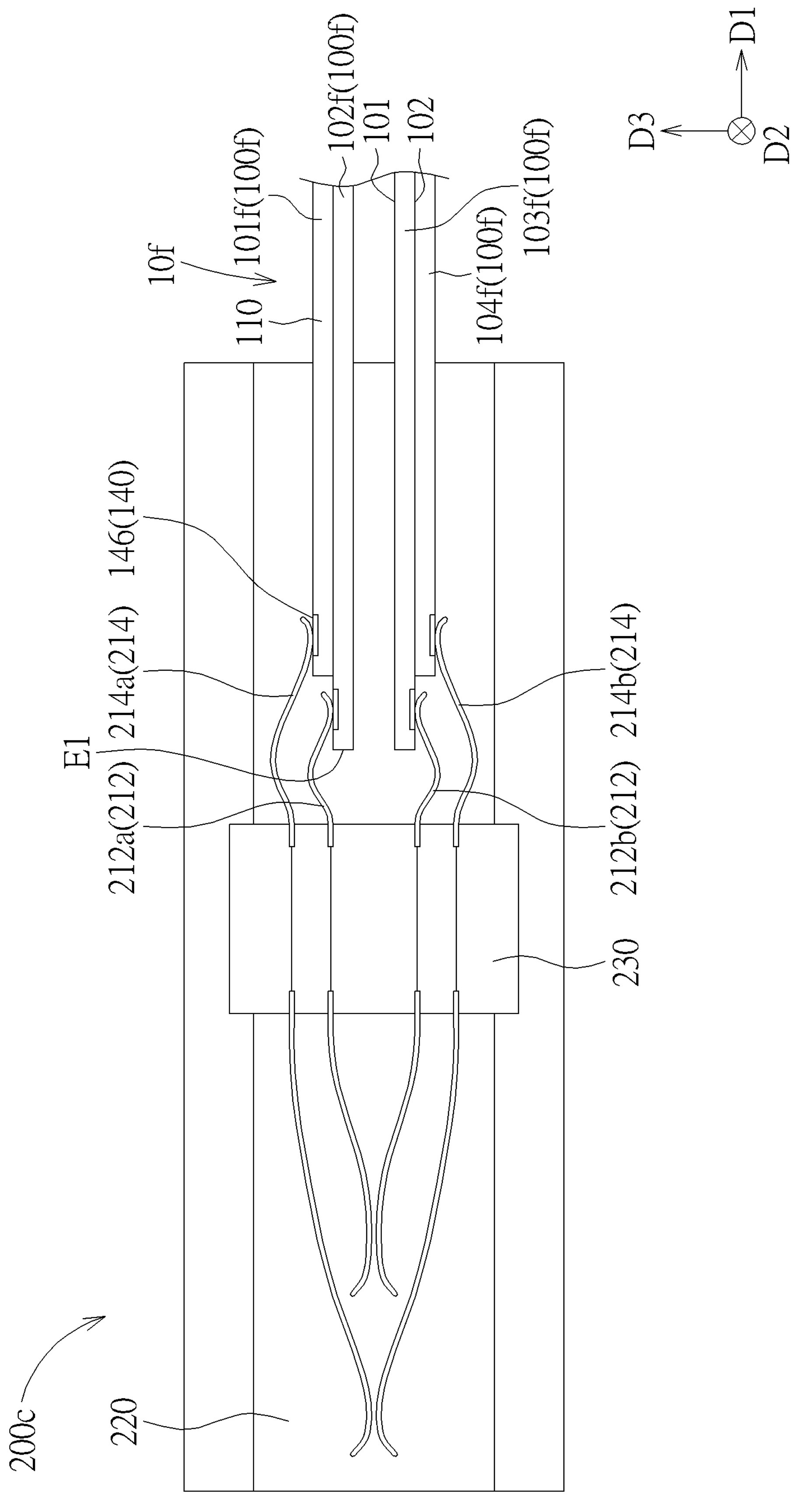
FIG. 11 is a combination schematic diagram of the connecting structure and a connector according to yet another embodiment of the present disclosure.

Please refer to FIG. 11, which is a combination schematic diagram of the connecting structure 10*f* and a connector 200*c* according to yet another embodiment of the present disclosure. In FIG. 11, the connecting structure 10*f* includes four flexible flat cables 100*f*. The structure of the flexible flat cable 100*f* may be the same as the structure of the flexible flat cable 100*a* shown in FIG. 1, the structure of the flexible flat cable 100*b* shown in FIG. 6 or the structure of the flexible flat cable 100*c* shown in FIG. 7. For the sake of simplicity, only the first end portions 110 of the flexible flat cables 100*f* are shown. The main difference between the connecting structure 10*f* shown in FIG. 11 and the connecting structure 10*d* shown in FIG. 8 is the arrangement of the flexible flat cables 100*f*. For the sake of explanation, the four flexible flat cables 100*f* are respectively named as a first flexible flat cable 101*f*, a second flexible flat cable 102*f*, a third flexible flat cable 103*f* and a fourth flexible flat cable 104*f* from top to bottom. The first pad region 140 of the first flexible flat cable 101*f* and the first pad region 140 of the second flexible flat cable 102*f* do not overlap in the vertical direction D3 and are misaligned with each other to form a step shape. The first pad region 140 of the third flexible flat cable 103*f* and the first pad region 140 of the fourth flexible flat cable 104*f* do not overlap in the vertical direction D3 and are misaligned with each other to form a step shape. The first pad region 140 of the first flexible flat cable 101*f* and the first pad region 140 of the fourth flexible flat cable 104*f* overlap in the vertical direction D3, and the first pad region 140 of the second flexible flat cable 102*f* and the first pad region 140 of the third flexible flat cable 103*f* overlap in the vertical direction D3. More specifically, the left end E1 of the first flexible flat cable 101*f* is aligned with the left end E1 of the fourth flexible flat cable 104*f* in the vertical direction D3, and the left end E1 of the second flexible flat cable 102*f* is aligned with the left end E1 of the third flexible flat cable 103*f* in the vertical direction D3.

There is no accommodating space S4 (see FIG. 8) between two first end portions 110 of the first flexible flat cable 101*f* and the second flexible flat cable 102*f* in the vertical direction D3, and there is no accommodating space S4 (see FIG. 8) between two first end portions 110 of the third flexible flat cable 103*f* and the fourth flexible flat cable 104*f* in the vertical direction D3. Moreover, the shapes of the right ends of the first terminal 212*a* and the second terminal 212*b* are changed so to form a clip to clamp and electrically contact the ground pad 146 or the signal pad 144, and the shapes of the right ends of the first terminal 214*a* and the second terminal 214*b* are changed so to form a clip to clamp and electrically contact the ground pad 146 or the signal pad 144. Therefore, the connecting structure 10*f* may be assembled with the connector 200*c* in a pluggable manner, which is favorable for simplify the assembling process.

Figure 12:
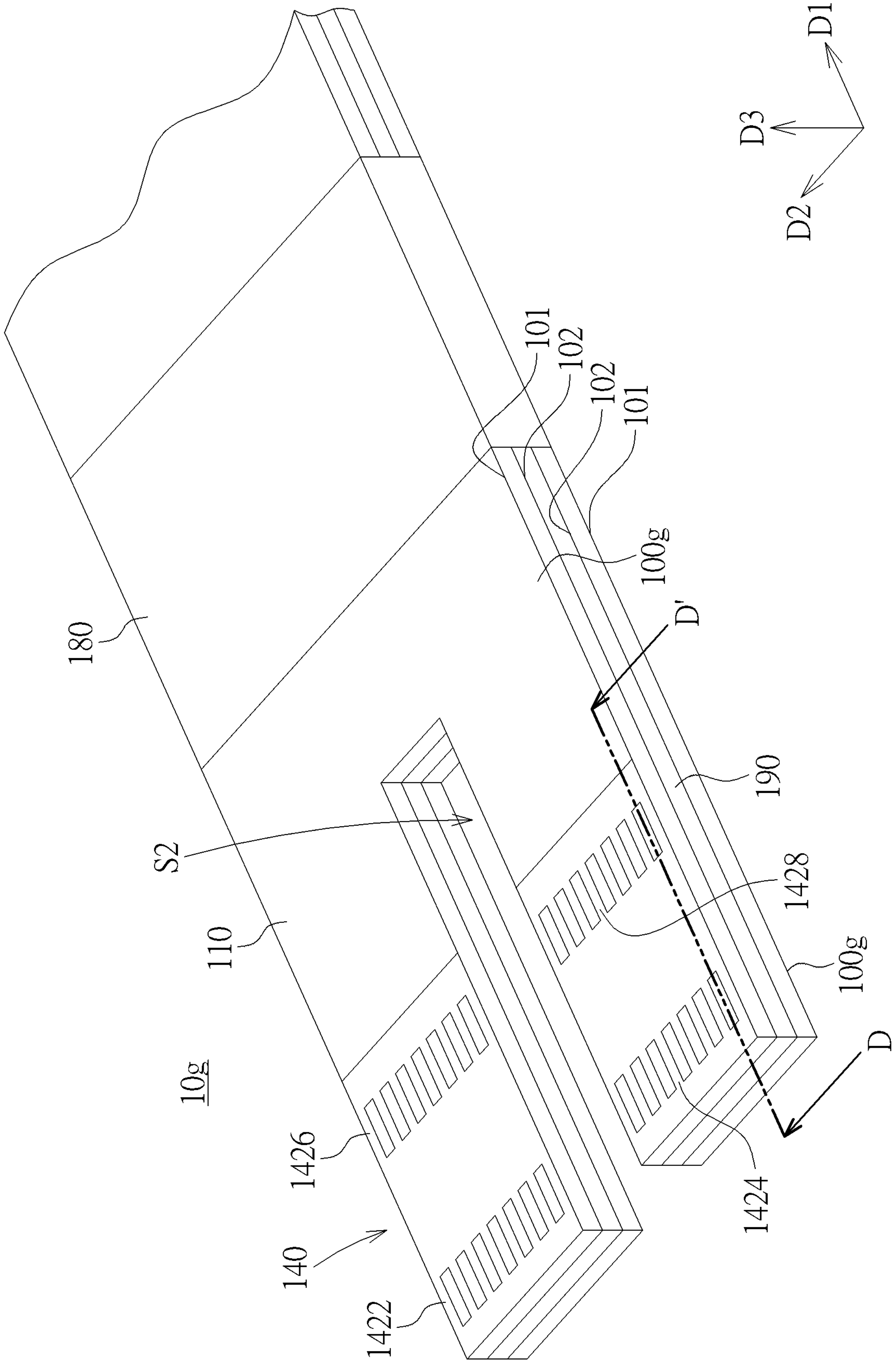
FIG. 12 is a three-dimensional diagram showing a portion of a connecting structure according to yet another embodiment of the present disclosure.
Figure 13:
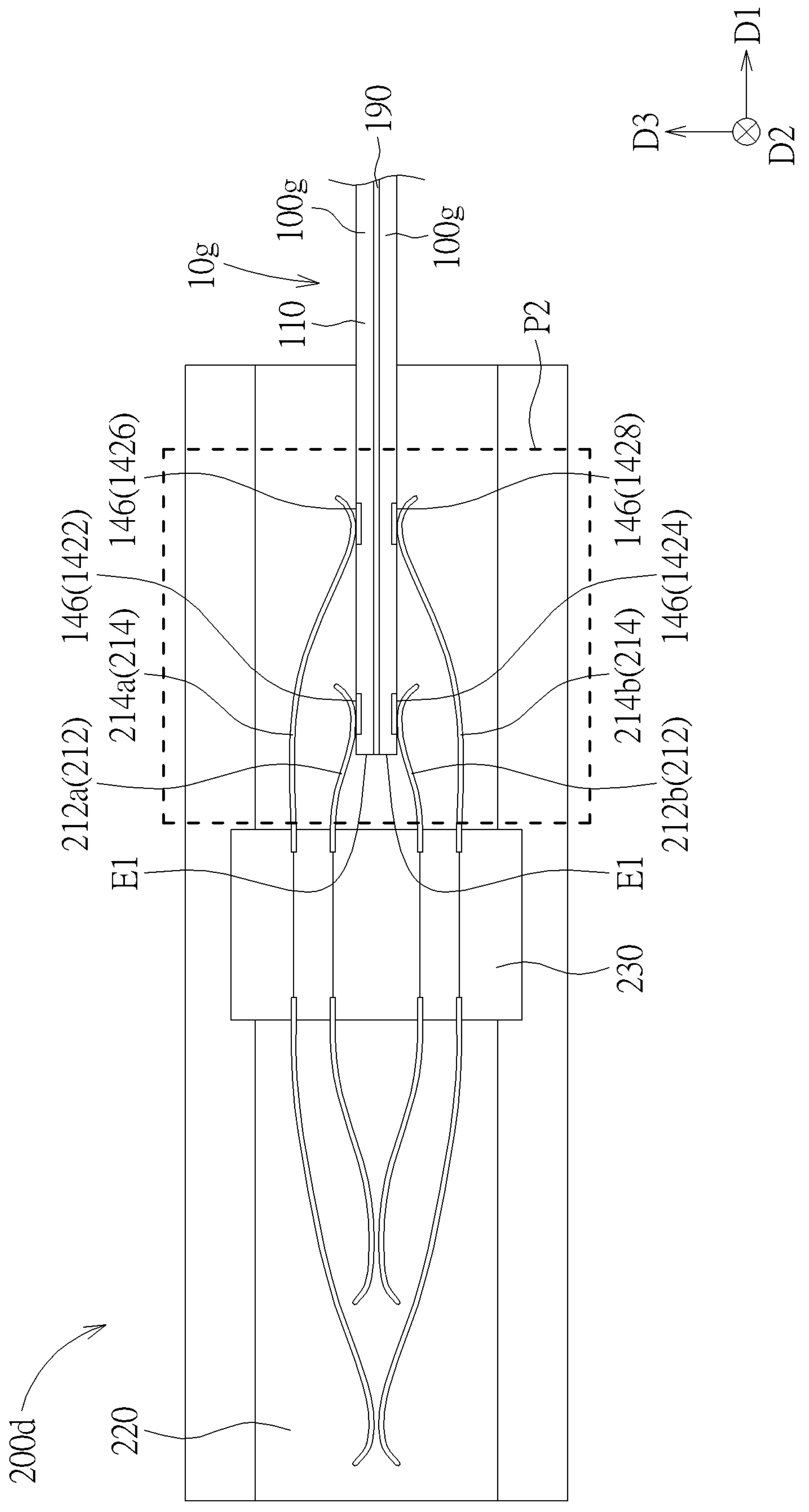
FIG. 13 is a combination schematic diagram of the connecting structure and a connector according to yet another embodiment of the present disclosure.
Figure 14:
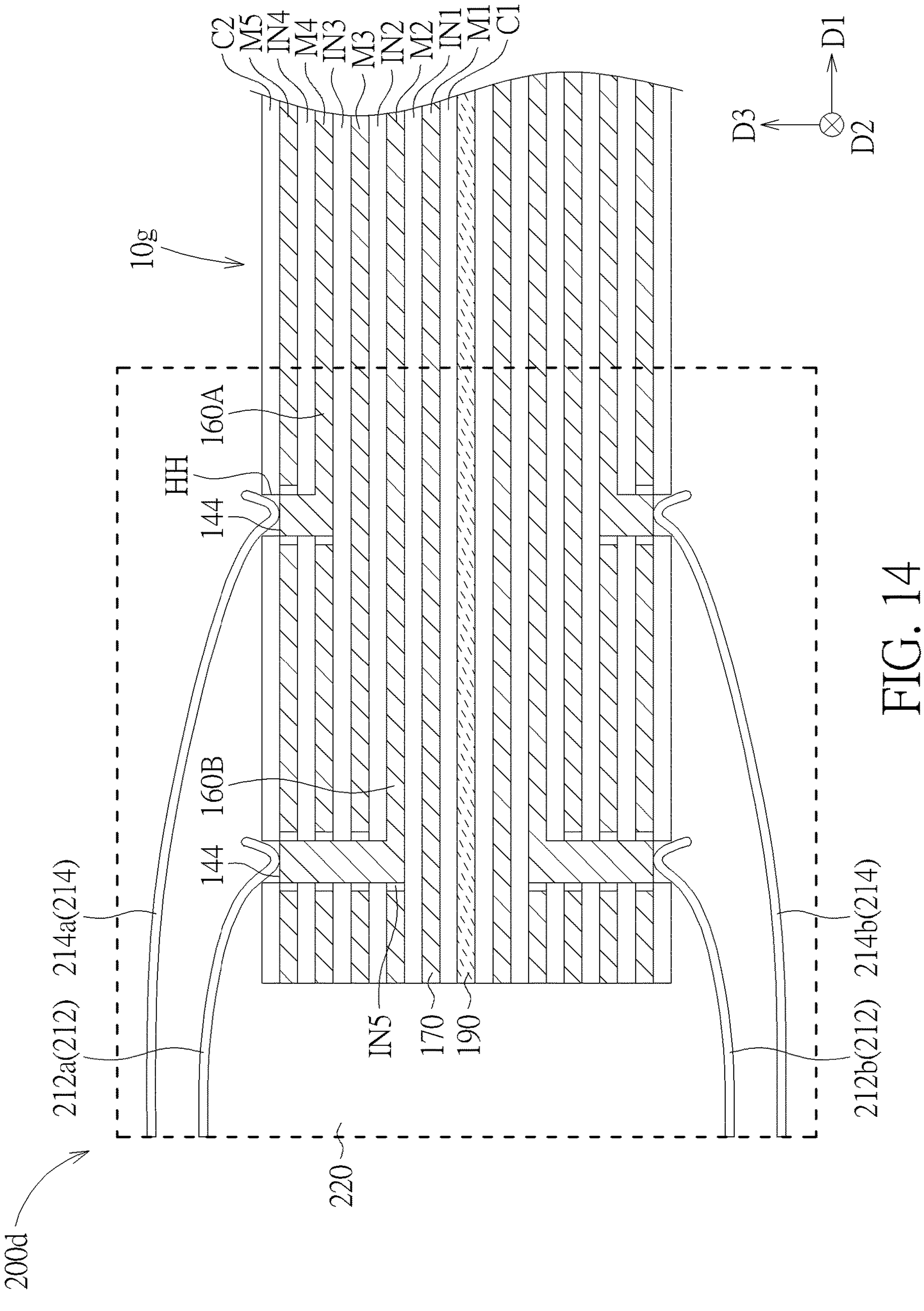
FIG. 14 schematically illustrates a cross-sectional view of the portion P2 shown in FIG. 13.

Please refer to FIG. 12, FIG. 13 and FIG. 14. FIG. 12 is a three-dimensional diagram showing a portion of a connecting structure 10*g* according to yet another embodiment of the present disclosure. FIG. 13 is a combination schematic diagram of the connecting structure 10*g* and a connector 200*d* according to yet another embodiment of the present disclosure. FIG. 14 schematically illustrates a cross-sectional view of the portion P2 shown in FIG. 13, and the view angle of FIG. 14 is corresponding to a line D-D' shown in FIG. 12. In FIG. 12, the connecting structure 10*g* includes two flexible flat cables 100*g*. Each of the flexible flat cables 100*g* has a first surface 101 and a second surface 102 opposite to the first surface 101, the first pad region 140 is disposed on the first surface 101, and the second surface 102 of one of the flexible flat cables 100*g* faces the second surface 102 of another one of the flexible flat cables 100*g*. The first pad region 140 includes a first sub-pad region 1422, a second sub-pad region 1424, a third sub-pad region 1426 and a fourth sub-pad region 1428, the first sub-pad region 1422 and the third sub-pad region 1426 are arranged along the length direction D1, and the second sub-pad region 1424 and the fourth sub-pad region 1428 are arranged along the length direction D1. The flexible flat cable 100*g* further includes a recess S2 formed between the first sub-pad region 1422 and the second sub-pad region 1424 and between the third sub-pad region 1426 and the fourth sub-pad region 1428.

As shown in FIG. 13, the left ends E1 of the two flexible flat cables 100*g* are aligned with each other in the vertical direction D3. The connector 200*d* includes a plurality of terminal pairs 212 and 214 corresponding to a plurality of signal pads 144 and a plurality of ground pads 146 of the first pad region 140. The plurality of terminal pairs 212 and 214 clamp the first end portion 110 and respectively contact the plurality of signal pads 144 and the plurality of ground pads 146. The main difference between the connector 200*d* and the connector 200*c* shown in FIG. 11 is the configuration of the right end of the first terminals 212*a*, 214*a* and the second terminals 212*b*, 214*b*. Specifically, due to the first sub-pad region 1422 and the third sub-pad region 1426 being disposed on a same plane (i.e., the first sub-pad region 1422 and the third sub-pad region 1426 being coplanar), and the second sub-pad region 1424 and the fourth sub-pad region 1428 being disposed on a same plane (i.e., the second sub-pad region 1424 and the fourth sub-pad region 1428 being coplanar), the portion of the first terminal 212*a* and the portion of the first terminal 214*a* contacting the flexible flat cable 100*g* are coplanar, and the portion of the second terminal 212*b* and the portion of the second terminal 214*b* contacting the flexible flat cable 100*g* are coplanar.

As shown in FIG. 14, the laminated structure includes, from bottom to top, a protective layer C1, a metal layer M1, an insulating layer IN1, a metal layer M2, an insulating layer IN2, a metal layer M3, an insulating layer IN3, a metal layer M4, an insulating layer IN4, a metal layer M5 and a protective layer C2. The signal pads 144 and the ground pads 146 are exposed from the holes HH formed in the protective layer C2. A portion of the metal layer M2, the metal layer M3, the metal layer M4 and the metal layer M5 together form the lower set of signal trace pattern 160B. Another portion of the metal layer M4 and another portion the metal layer M5 together form the upper set of signal trace pattern 160A. The metal layer M1 below the portion of the metal layer M2 being the lower set of signal trace pattern 160B and the metal layer M3 above the portion of the metal layer M2 being the lower set of signal trace pattern 160B form a shielding structure 170 surrounds the lower set of signal trace pattern 160B, and the shielding structure 170 and the lower set of signal trace pattern 160B are electrically isolated with each other. For example, the insulating structure IN5 may be disposed between the shielding structure 170 and the lower set of signal trace pattern 160B. The metal layer M3 below the portion of the metal layer M4 being the upper set of signal trace pattern 160A and the metal layer M5 above the portion of the metal layer M4 being the upper set of signal trace pattern 160A form a shielding structure 170 surrounds the upper set of signal trace pattern 160A, and the shielding structure 170 and the upper set of signal trace pattern 160A are electrically isolated with each other. For example, an insulating structure IN5 may be disposed between the shielding structure 170 and the upper set of signal trace pattern 160A. That is, the shielding structure 170 is disposed between the upper set of signal trace pattern 160A and the lower set of signal trace pattern 160B. Herein, the upper set of signal trace pattern 160A refers to the signal trace pattern which is closer to the first surface 101 along the vertical direction D3, and the lower set of signal trace pattern 160B refers to the signal trace pattern which is closer to the second surface 102 along the vertical direction D3. That is, the main difference between the flexible flat cable 100*g* and the flexible flat cables 100*a* (see FIG. 3 and FIG. 4) is the number of the layers of the flexible flat cable 100*g* being different from that of the flexible flat cables 100*a*. The upper set of signal trace pattern 160A and the lower set of signal trace pattern 160B form a double-layer signal trace pattern, which is favorable for enhancing the channel density.

Figure 15:
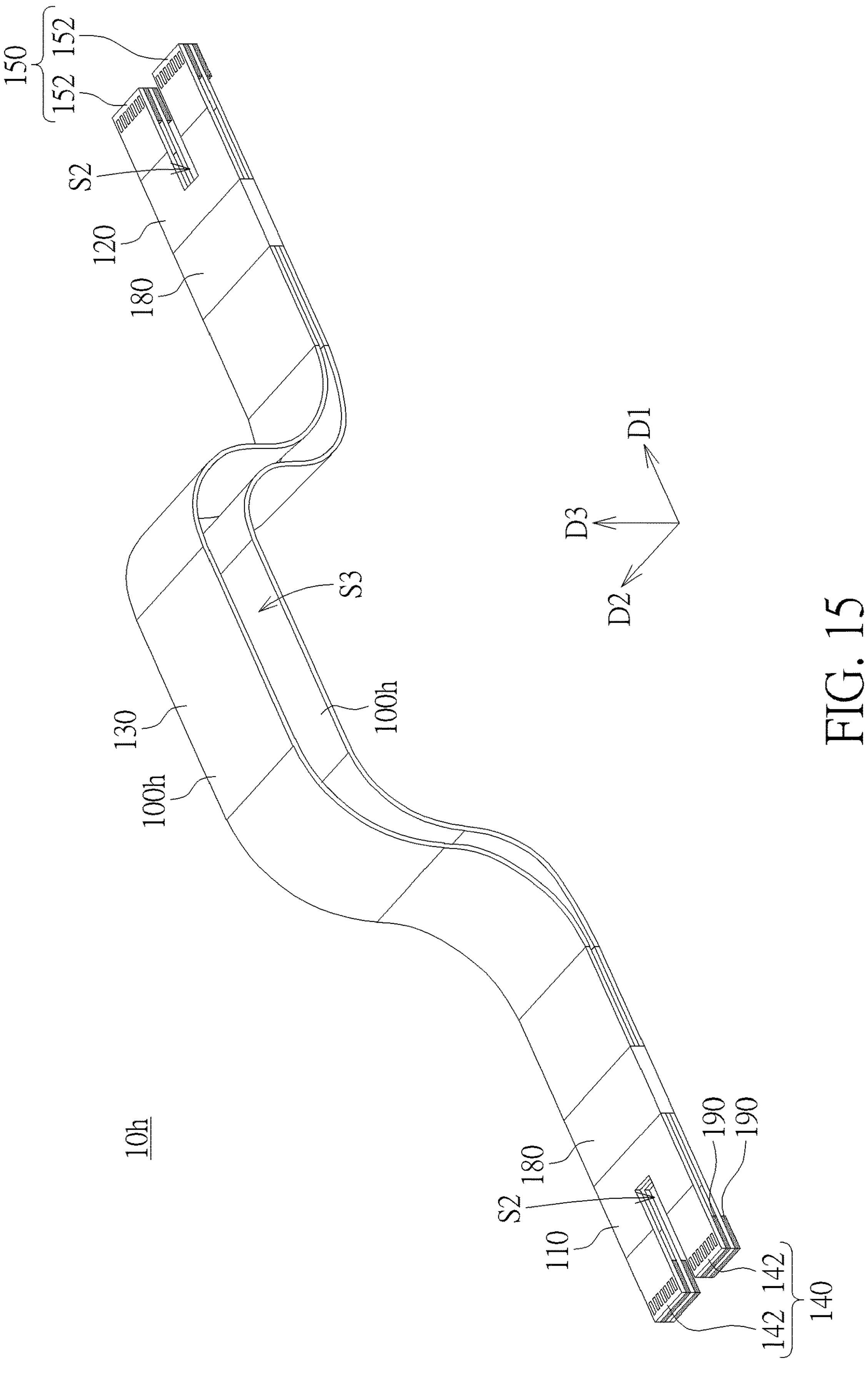
FIG. 15 is a three-dimensional diagram showing a connecting structure according to yet another embodiment of the present disclosure.

Please refer to FIG. 15, which is a three-dimensional diagram showing a connecting structure 10*h* according to yet another embodiment of the present disclosure. As shown in FIG. 15, the main difference between the flexible flat cable 100*h* and the flexible flat cable 100*a* shown in FIG. 1 is the connecting portion 130 of the flexible flat cable 100*h* is not formed with the slot S1. For details of the flexible flat cable 100*h*, reference may be made to that of the flexible flat cable 100*a* shown in FIG. 1. Specifically, the connecting structure 10*h* includes two flexible flat cables 100*h* and two fixing member 180. Each of the flexible flat cables 100*h* includes a first end portion 110, a second end portion 120, a connecting portion 130, a first pad region 140 and a second pad region 150. The connecting portion 130 is connected between the first end portion 110 and the second end portion 120. The first pad region 140 is disposed on the first end portion 110. The second pad region 150 is disposed on the second end portion 120. The flexible flat cable 100*h* is a laminated structure including at least one set of signal trace pattern 160 (see FIG. 3) and at least one shielding structure 170 (see FIG. 3). The at least one shielding structure 170 correspondingly surrounds the at least one set of signal trace pattern 160 in the connecting portion 130. The two flexible flat cables 100*h* are arranged along a vertical direction D3, and there is a space S3 between the two connecting portions 130 of the two flexible flat cables 100*h*. One of the fixing members 180 is disposed at one side of the connecting portion 130 of each of the two flexible flat cables 100*h* adjacent to the first end portion 110 to bond the two flexible flat cables 100*h*, and the other one of the fixing members 180 is disposed at one side of the connecting portion 130 of each of the two flexible flat cables 100*h* adjacent to the second end portion 120 to bond the two flexible flat cables 100*h*. With the space S3, it is favorable for reducing stress when the two flexible flat cables 100*h* are assembled on a hard board. With the fixing member 180, it is favorable for simultaneously picking or moving the two flexible flat cables 100*h*, which is favorable for simplifying the assembling process, so as to improve the assembly convenience.

Figure 16:
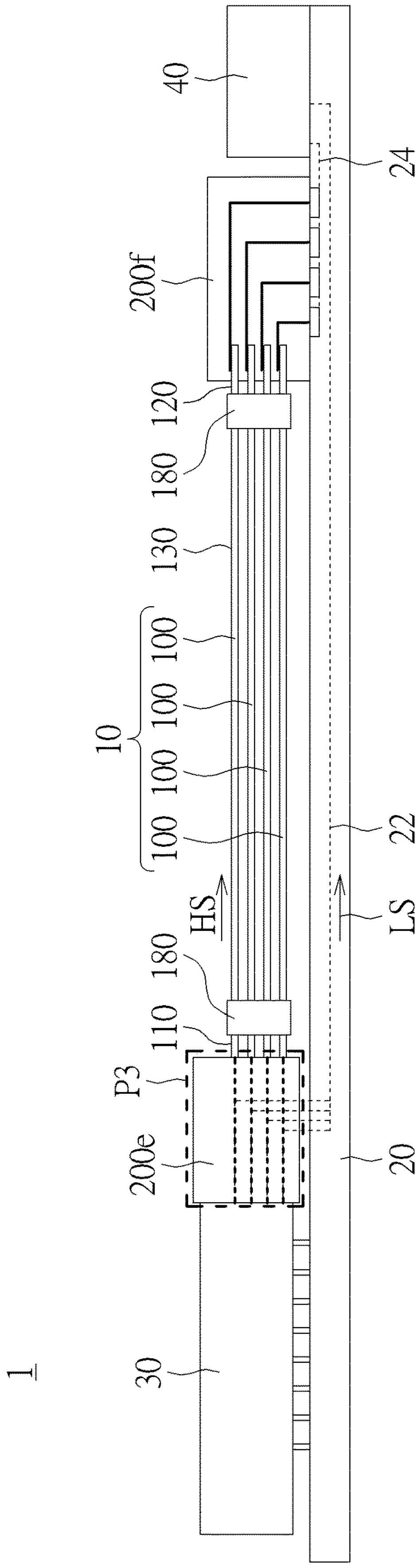
FIG. 16 is a schematic diagram showing a signal transmission system according to an embodiment of the present disclosure.
Figure 17:
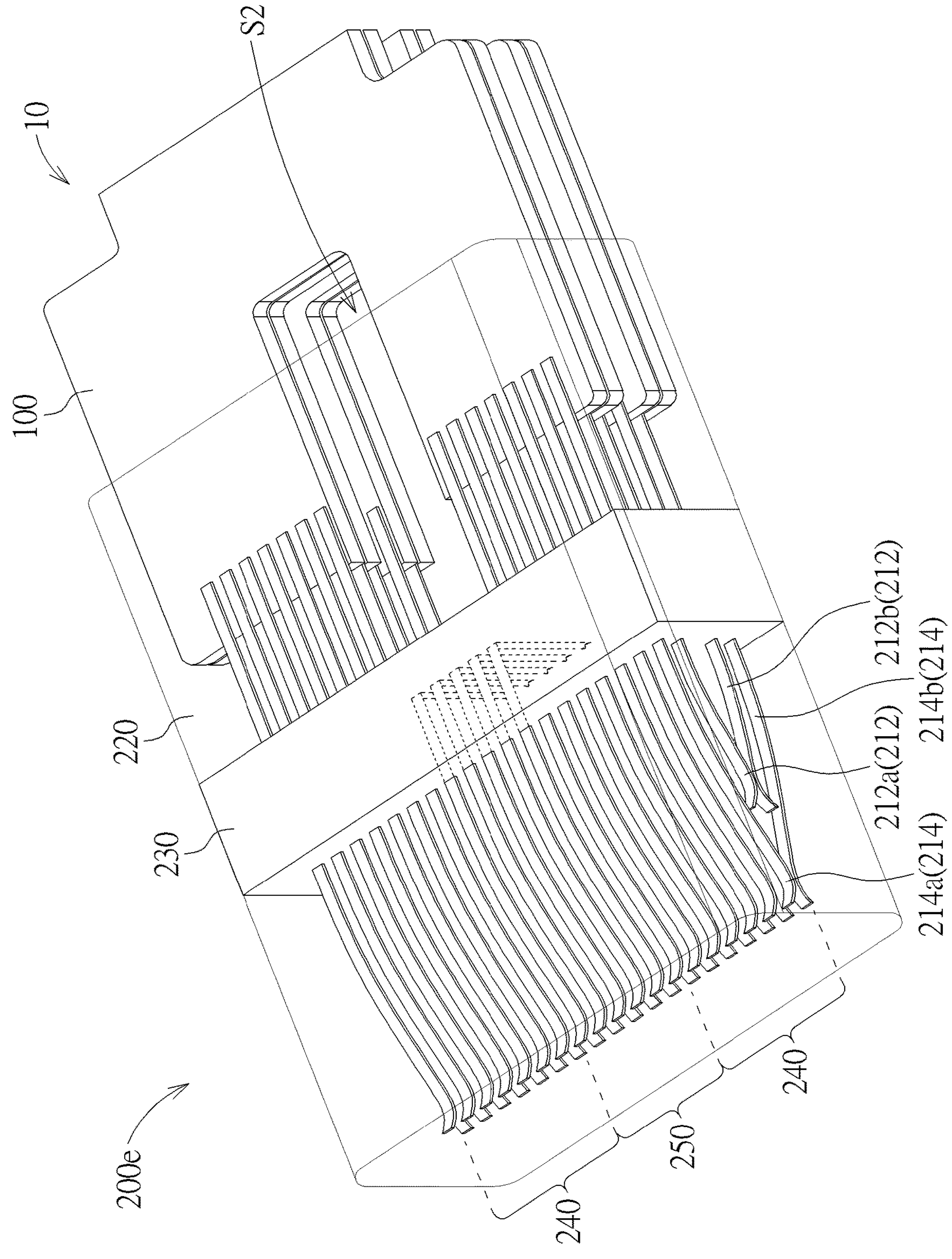
FIG. 17 is a three-dimensional diagram showing the connector and the connecting structure shown in FIG. 16.

Please refer to FIG. 16 and FIG. 17. FIG. 16 is a schematic diagram showing a signal transmission system 1 according to an embodiment of the present disclosure. FIG. 17 is a three-dimensional diagram showing the connector 200*e* and the connecting structure 10 shown in FIG. 16, which is corresponding to the portion P3 shown in FIG. 16. The signal transmission system 1 includes a system board 20, a first device 30, a second device 40 and a connecting structure 10. The first device 30 is coupled to the system board 20. The first device 30 is configured to provide a high-speed signal HS and a low-speed signal LS. The second device 40 is coupled to the system board 20. The connecting structure 10 includes four flexible flat cables 100. Each of the flexible flat cables 100 includes a first end portion 110, a second end portion 120, a connecting portion 130, a first pad region (not shown) and a second pad region (not shown). The first end portion 110 and the second end portion 120 are respectively coupled to the first device 30 and the second device 40. The first pad region is disposed on the first end portion 110. The second pad region is disposed on the second end portion 120. The flexible flat cable 100 is a laminated structure including at least one set of signal trace pattern (not shown) and at least one shielding structure (not shown). The at least one shielding structure correspondingly surrounds the at least one set of signal trace pattern in the connecting portion 130. The low-speed signal LS is transmitted from the first device 30 to the second device 40 through the system board 20, and the high-speed signal HS is transmitted from the first device 30 to the second device 40 through the connecting structure 10.

The first end portion 110 of the flexible flat cable 100 is coupled to the first device 30 through the connector 200*e*, and the second end portion 120 of the flexible flat cable 100 is coupled to the second device 40 through the connector 200*f*. More specifically, both the connector 200*f* and the second device 40 are coupled to the system board 20 and electrically connected with each other through the trace pattern 24 of the system board 20. That is, the second end portion 120 of the flexible flat cable 100 is coupled to the second device 40 through the connector 200*f* and the system board 20.

As shown in FIG. 17, the connector 200*e* may include a fixed base 230, a housing 220, two sets of high-speed signal terminal pairs 240 and a set of low-speed signal terminal pairs 250. The set of low-speed signal terminal pairs 250 is located between the two sets of high-speed signal terminal pairs 240 and is corresponding to the recess S2 of the flexible flat cable 100. Each of the sets of high-speed signal terminal pairs 240 includes seven terminal pairs 212 and seven terminal pairs 214. The set of low-speed signal terminal pairs 250 includes five terminal pairs 212 and five terminal pairs 214. Each of the terminal pairs 212 includes a first terminal 212*a* and a second terminal 212*b*. Each of the terminal pairs 214 includes a first terminal 214*a* and a second terminal 214*b*. The left ends of the terminal pairs 212 and 214 of the set of high-speed signal terminal pairs 240 protrude from the fixed base 230 to form clips to clamp the first device 30, and the right ends of the terminal pairs 212 and 214 of the set of high-speed signal terminal pairs 240 protrude from the fixed base 230 to electrically connect (or physically contact) with the signal pads and the ground pads on the first pad regions of the flexible flat cables 100. The left ends of the terminal pairs 212 and 214 of the set of low-speed signal terminal pairs 250 protrude from the fixed base 230 to form clips to clamp the first device 30, and the right ends of the terminal pairs 212 and 214 of the set of low-speed signal terminal pairs 250 protrude from the fixed base 230 and bend downwardly to electrically connect (or physically contact) with the trace pattern 22 of the system board 20. Thereby, the low-speed signal LS is transmitted from the first device 30 to the second device 40 through the system board 20, and the high-speed signal HS is transmitted from the first device 30 to the second device 40 through flexible flat cables 100 of the connecting structure 10. Compared with both the high-speed signal HS and the low-speed signal LS being transmitted through the system board 20, it is favorable for reducing the insertion loss when the high-speed signal HS is transmitted through the flexible flat cables 100. Compared with both the high-speed signal HS and the low-speed signal LS being transmitted through the flexible flat cables 100, it is favorable for reducing cost when the low-speed signal LS being transmitted through the system board 20.

The system board 20, for example, may be a printed circuit board (PCB) or a switch host board. The first device 30, for example, may be a pluggable optical module. The connector 200*e*, for example, may be a quad small form factor pluggable-double density (QSFP-DD) connector. The first device 30, for example, may be connected with the connector 200*e* in a pluggable manner. The second device 40, for example, may be an integrated circuit such as an application specific integrated circuit (ASIC). The signal transmission system 1, for example, may be a network communication system.

The high-speed signal HS may refer to a signal with a speed greater than or equal to 112 Gbits/sec, and the low-speed signal LS may refer to a signal with a speed less than 112 Gbits/sec. For example, the low-speed signal LS may be applied to transmit low-frequency signals, control signals, power, or ground In FIG. 16, the number of the flexible flat cables 100 is four, which is exemplarily and the present disclosure is not limited thereto. The flexible flat cable 100 may be the aforementioned flexible flat cable 100*a*, 100*b*, 100*c*, 100*d*, 100*e*, 100*f*, 100*g* or 100*h*. Also, the connecting structure 10 may be replaced by the aforementioned connecting structure 10*a*, 10*b*, 10*c*, 10*d*, 10*e*, 10*f*, 10*g* or 10*h*, and the structure of the connector 200*e* and the structure of the connector 200*f* may be adjusted accordingly.

According to the present disclosure, the connecting structure includes a flexible flat cable. Compared with the PCB, it is favorable for reducing the insertion loss by transmitting signals through the flexible flat cable. Therefore, the connecting structure according to the present disclosure is favorable for the application of high-speed signal transmission. Compared with the twinax cable, it is favorable for simplifying the assembling process by using the flexible flat cable to transmit signals. Accordingly, it may reduce the entire assembly cost. The flexible flat cable may include a slot formed in the connecting portion thereof, which is favorable for reducing the bending stress and/or twist stress during assembly. The flexible flat cable may include a recess formed between the two sub-pad regions of the first pad region, which is favorable for transmitting the high-speed signal and the low-speed signal separately, and thus may provide a better isolation degree for the high-speed signal and the low-speed signal. Moreover, it is favorable for maintain the property of the high-speed signal. The connecting structure may include a plurality of flexible flat cables arranged along the vertical direction, which is favorable for increasing the channel density, and is favorable for enhancing the flow efficiency of the cooling air, and may provide a better cooling effect. The connecting structure may include a space between two connecting portions of two flexible flat cables, which is favorable for the two flexible flat cables being configured with different lengths, so that the two flexible flat cables may be used to transmit signals with different properties. The connecting structure may include a fixing member disposed at one side of the connecting portion of each of the flexible flat cables adjacent to the first end portion to bond the flexible flat cables, which is favorable for simultaneously picking or moving the plurality of flexible flat cables, so that the flexible flat cables may be assembled with a connector at the same time. The connecting structure may include a spacer disposed between the two first end portions of two adjacent flexible flat cables, which is beneficial to reduce the crosstalk between the two flexible flat cables, and is beneficial to strengthen the structural strength.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting structure, comprising:

a flexible flat cable, comprising:

a first end portion, a second end portion and a connecting portion connected between the first end portion and the second end portion;

a first pad region disposed on the first end portion and a second pad region disposed on the second end portion; and a slot formed in the connecting portion, wherein the slot is extended along a length direction of the flexible flat cable;

wherein the flexible flat cable is a laminated structure comprising a set of signal trace pattern and a shielding structure, the shielding structure correspondingly surrounds the set of signal trace pattern in the connecting portion, the shielding structure comprises two side shields, an upper shield, and a lower shield, and in a cross-section of the connecting portion, the two side shields are respectively disposed on two sides of the set of signal trace pattern and extend from the upper shield to be electrically connected to the lower shield.

2. The connecting structure of claim 1, wherein the first pad region comprises two sub-pad regions, and the flexible flat cable further comprises a recess formed between the two sub-pad regions.

3. The connecting structure of claim 2, wherein the slot is aligned with the recess along the length direction of the flexible flat cable.

4. The connecting structure of claim 1, wherein a number of the flexible flat cables is two, and the two flexible flat cables are arranged along a vertical direction.

5. The connecting structure of claim 4, wherein there is a space between the two connecting portions of the two flexible flat cables.

6. The connecting structure of claim 4, further comprising:

a fixing member disposed at one side of the connecting portion of each of the two flexible flat cables adjacent to the first end portion to bond the two flexible flat cables.

7. The connecting structure of claim 4, wherein the two first end portions of the two flexible flat cables are bonded with each other.

8. The connecting structure of claim 7, wherein the two first end portions of the two flexible flat cables are bonded with each other through a spacer, and the spacer overlaps the two first end portions of the two flexible flat cables.

9. The connecting structure of claim 4, wherein the two second end portions of the two flexible flat cables are separated from each other.

10. The connecting structure of claim 4, wherein the two first pad regions of the two flexible flat cables overlap each other in the vertical direction, and there is an accommodating space between the two first end portions of the two flexible flat cables in the vertical direction.

11. The connecting structure of claim 4, wherein the two first pad regions of the two flexible flat cables do not overlap each other in the vertical direction, and are misaligned with each other to form a step shape.

12. The connecting structure of claim 4, wherein each of the flexible flat cables has a first surface and a second surface opposite to the first surface, the first pad region is disposed on the first surface, and the first surface of one of the flexible flat cables faces the second surface of another one of the flexible flat cables.

13. The connecting structure of claim 4, wherein each of the flexible flat cables has a first surface and a second surface opposite to the first surface, the first pad region is disposed on the first surface, and the second surface of one of the flexible flat cables faces the second surface of another one of the flexible flat cables.

14. The connecting structure of claim 4, further comprising:

a spacer disposed between the two first end portions of the two flexible flat cables, the spacer overlaps the two first end portions of the two flexible flat cables, and the spacer is made of conductive material.

15. The connecting structure of claim 1, wherein a number of the flexible flat cables is four, the four flexible flat cables are arranged along a vertical direction, the four flexible flat cables are respectively a first flexible flat cable, a second flexible flat cable, a third flexible flat cable and a fourth flexible flat cable from top to bottom, the first pad region of the first flexible flat cable and the first pad region of the second flexible flat cable do not overlap in the vertical direction and are misaligned with each other to form a step shape, the first pad region of the third flexible flat cable and the first pad region of the fourth flexible flat cable do not overlap in the vertical direction and are misaligned with each other to form a step shape, the first pad region of the first flexible flat cable and the first pad region of the fourth flexible flat cable overlap in the vertical direction, and the first pad region of the second flexible flat cable and the first pad region of the third flexible flat cable overlap in the vertical direction.

16. The connecting structure of claim 1, wherein the set of signal trace pattern is electrically connected to a signal pad disposed on the first pad region, and the shielding structure is electrically connected to a ground pad disposed on the first pad region.

17. The connecting structure of claim 16, wherein the set of signal trace pattern and the shielding structure overlap in a width direction of the flexible flat cable in the first end portion.

18. The connecting structure of claim 16, wherein the set of signal trace pattern comprises a first signal trace pattern and a second signal trace pattern arranged along a width direction of the flexible flat cable.

19. The connecting structure of claim 18, wherein the first signal trace pattern and the second signal trace pattern form a differential signal pair.

20. The connecting structure of claim 1, wherein the flexible flat cable comprises a plurality of sets of signal trace patterns and a plurality of shielding structures, and the plurality of shielding structures correspondingly and respectively surround the plurality of sets of signal trace patterns.

21. The connecting structure of claim 1, wherein the first pad region comprises a first ground pad, a first signal pad, a second signal pad and a second ground pad arranged in sequence along a width direction of the flexible flat cable.

22. The connecting structure of claim 1, wherein the first pad region comprises a first sub-pad region, a second sub-pad region, a third sub-pad region and a fourth sub-pad region, the first sub-pad region and the third sub-pad region are arranged along the length direction, the second sub-pad region and the fourth sub-pad region are arranged along the length direction, and the flexible flat cable further comprises a recess formed between the first sub-pad region and the second sub-pad region and between the third sub-pad region and the fourth sub-pad region.

23. The connecting structure of claim 22, wherein the flexible flat cable comprises two sets of signal trace patterns, and the two sets of signal trace patterns are an upper set of signal trace pattern and a lower set of signal trace pattern, and the shielding structure is disposed between the upper set of signal trace pattern and the lower set of signal trace pattern.

24. The connecting structure of claim 1, further comprising:

a connector comprising a plurality of terminal pairs corresponding to a plurality of signal pads of the first pad region, wherein the plurality of terminal pairs clamp the first end portion and respectively contact the plurality of signal pads.

25. The connecting structure of claim 1, further comprising another set of signal trace pattern and another shielding structure, wherein the another set of signal trace pattern is disposed on one of the two sides of the set of signal trace pattern, the another shielding structure correspondingly surrounds the another set of signal trace pattern in the connecting portion, the another shielding structure comprises two side shields, an upper shield, and a lower shield, and in a cross-section of the connecting portion, the two side shields of the another shielding structure are respectively disposed on two sides of the another set of signal trace pattern and extend from the upper shield of the another shielding structure to be electrically connected to the lower shield of the another shielding structure.

26. A signal transmission system, comprising:

a system board;

a first device coupled to the system board, wherein the first device is configured to provide a high-speed signal and a low-speed signal;

a second device coupled to the system board; and a connecting structure comprising a flexible flat cable, wherein the flexible flat cable comprises:

a first end portion, a second end portion and a connecting portion connected between the first end portion and the second end portion, wherein the first end portion and the second end portion are respectively coupled to the first device and the second device; and a first pad region disposed on the first end portion and a second pad region disposed on the second end portion;

wherein the flexible flat cable is a laminated structure comprising a set of signal trace pattern and a shielding structure, and the shielding structure correspondingly surrounds the set of signal trace pattern in the connecting portion, the shielding structure comprises two side shields, an upper shield, and a lower shield, and in a cross-section of the connecting portion, the two side shields are respectively disposed on two sides of the set of signal trace pattern and extend from the upper shield to be electrically connected to the lower shield;

wherein the low-speed signal is transmitted from the first device to the second device through the system board, and the high-speed signal is transmitted from the first device to the second device through the connecting structure.

27. The signal transmission system of claim 26, wherein the high-speed signal is transmitted in a speed greater than or equal to 112 Gbits/sec.

28. A connecting structure, comprising:

two flexible flat cables, each of the flexible flat cables comprising:

a first end portion, a second end portion and a connecting portion connected between the first end portion and the second end portion; and a first pad region disposed on the first end portion and a second pad region disposed on the second end portion, wherein each of the flexible flat cables is a laminated structure comprising a set of signal trace pattern and a shielding structure, and the shielding structure correspondingly surrounds the set of signal trace pattern in the connecting portion, the shielding structure comprises two side shields, an upper shield, and a lower shield, and in a cross-section of the connecting portion, the two side shields are respectively disposed on two sides of the set of signal trace pattern and extend from the upper shield to be electrically connected to the lower shield, the two flexible flat cables are arranged along a vertical direction, and there is a space between the two connecting portions of the two flexible flat cables; and a fixing member disposed at one side of the connecting portion of each of the two flexible flat cables adjacent to the first end portion to bond the two flexible flat cables.

* * * * *